Aug. 14, 1951  E. A. ROCKWELL  2,564,582
INTENSIFIER FOR THE APPLICATION OF POWER
Filed Oct. 20, 1943  16 Sheets-Sheet 1
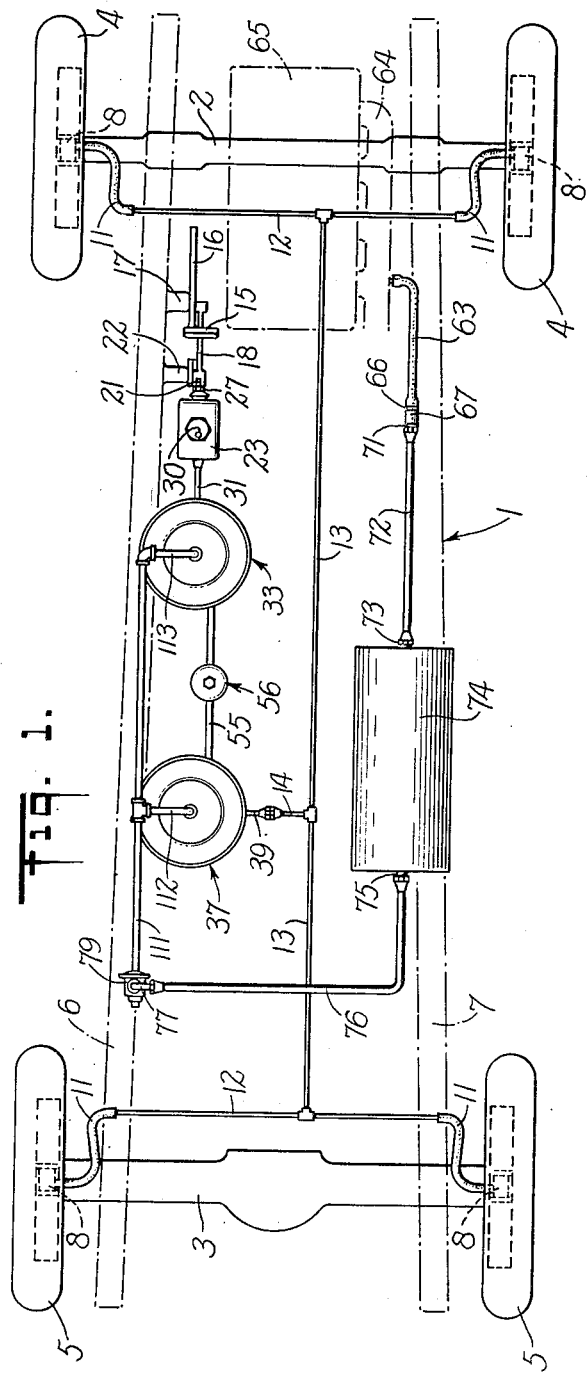
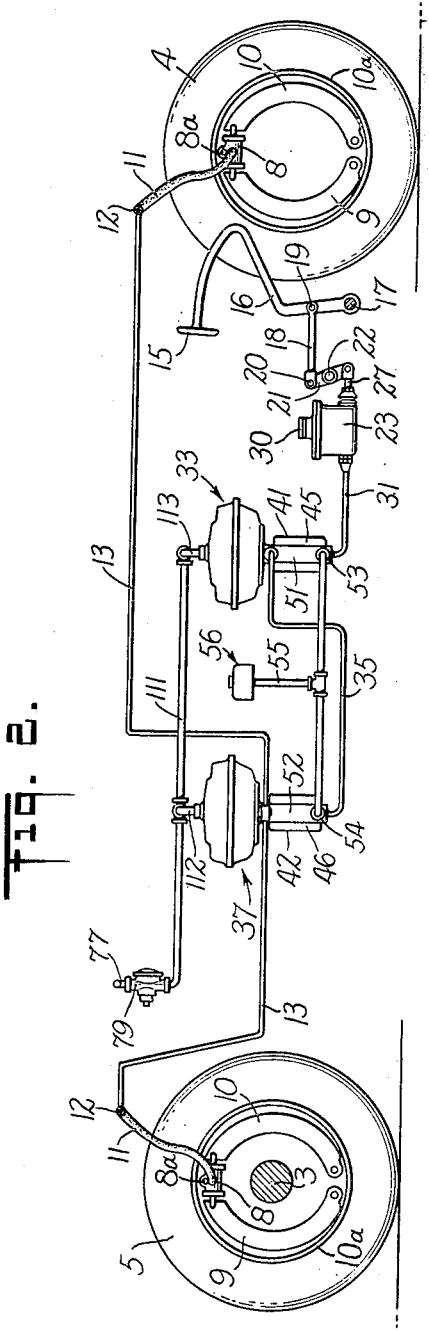
INVENTOR
*Edward A. Rockwell*
BY
*Arthur Wright*
ATTORNEY Aug. 14, 1951 E. A. ROCKWELL 2,564,582
INTENSIFIER FOR THE APPLICATION OF POWER
Filed Oct. 20, 1943 16 Sheets-Sheet 2

INVENTOR
Edward A. Rockwell
BY
Arthur Wright
ATTORNEY

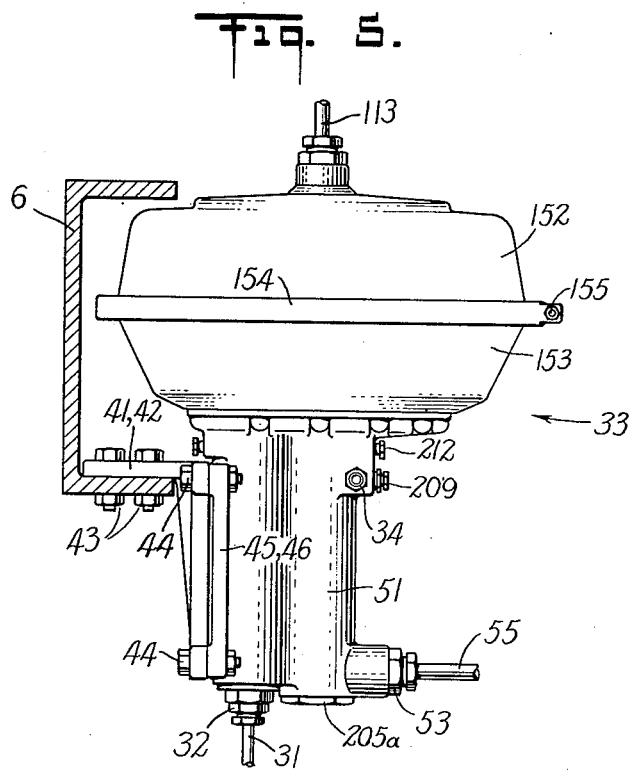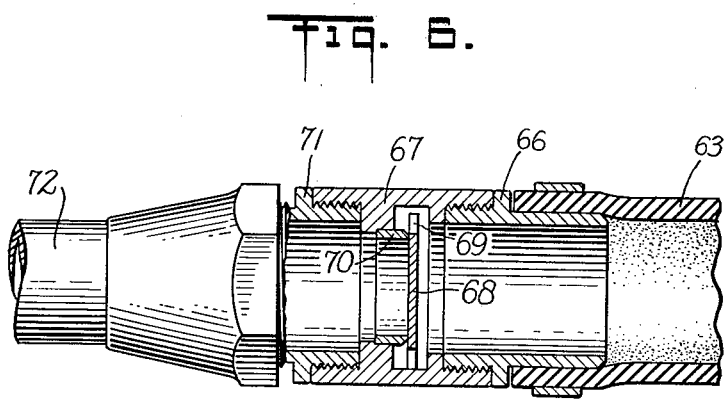

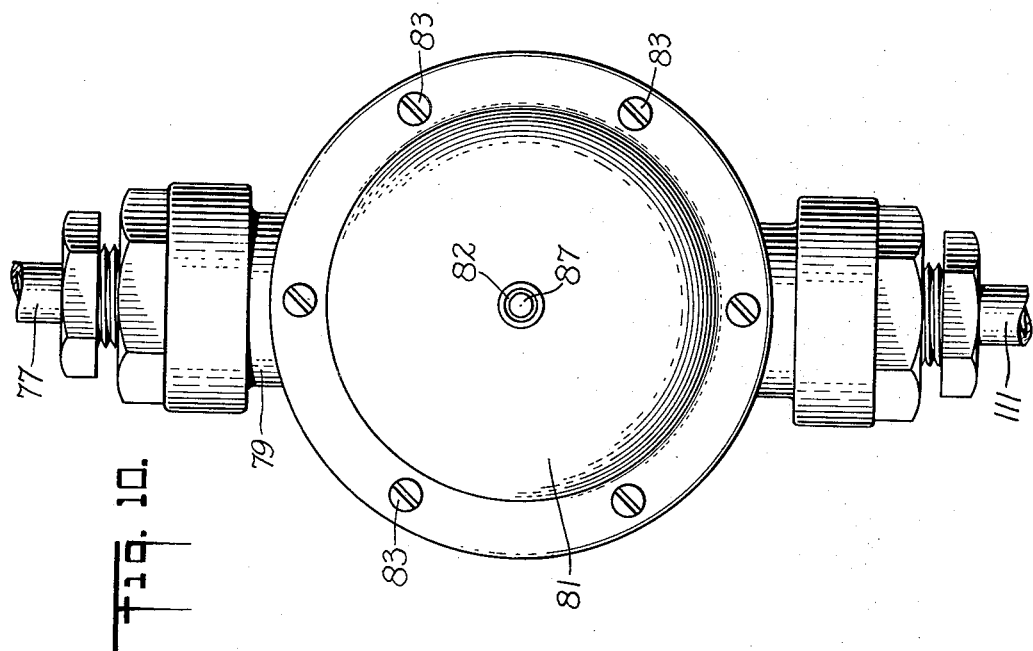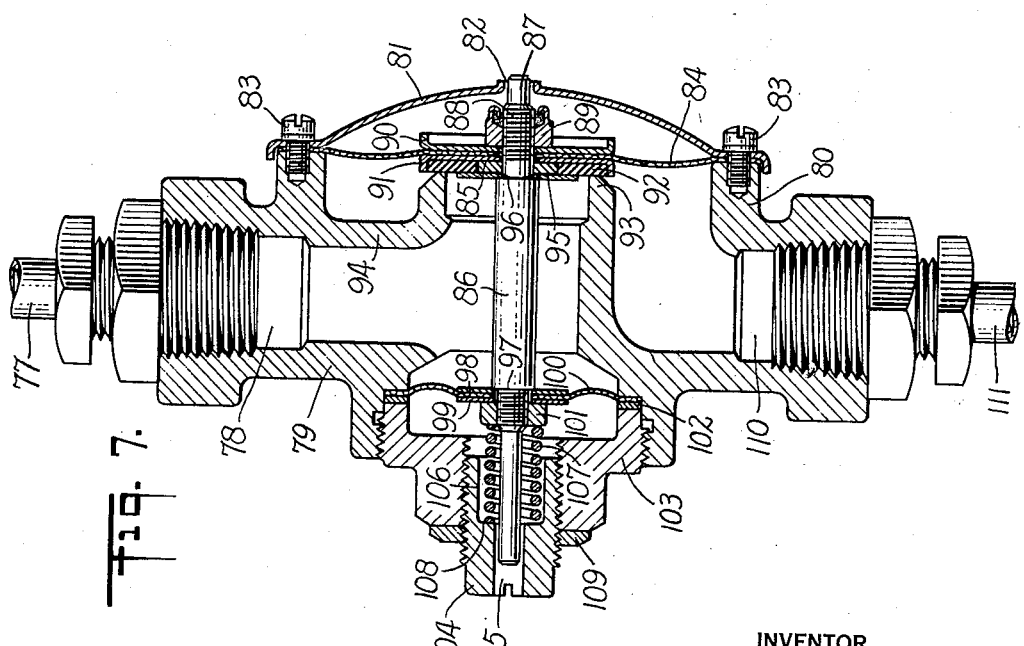

INVENTOR
Edward A. Rockwell
BY
Arthur Wright
ATTORNEY

Aug. 14, 1951     E. A. ROCKWELL     2,564,582
INTENSIFIER FOR THE APPLICATION OF POWER
Filed Oct. 20, 1943     16 Sheets-Sheet 6

Fig. 9.

INVENTOR
*Edward A. Rockwell*
BY
*Arthur Wright*
ATTORNEY

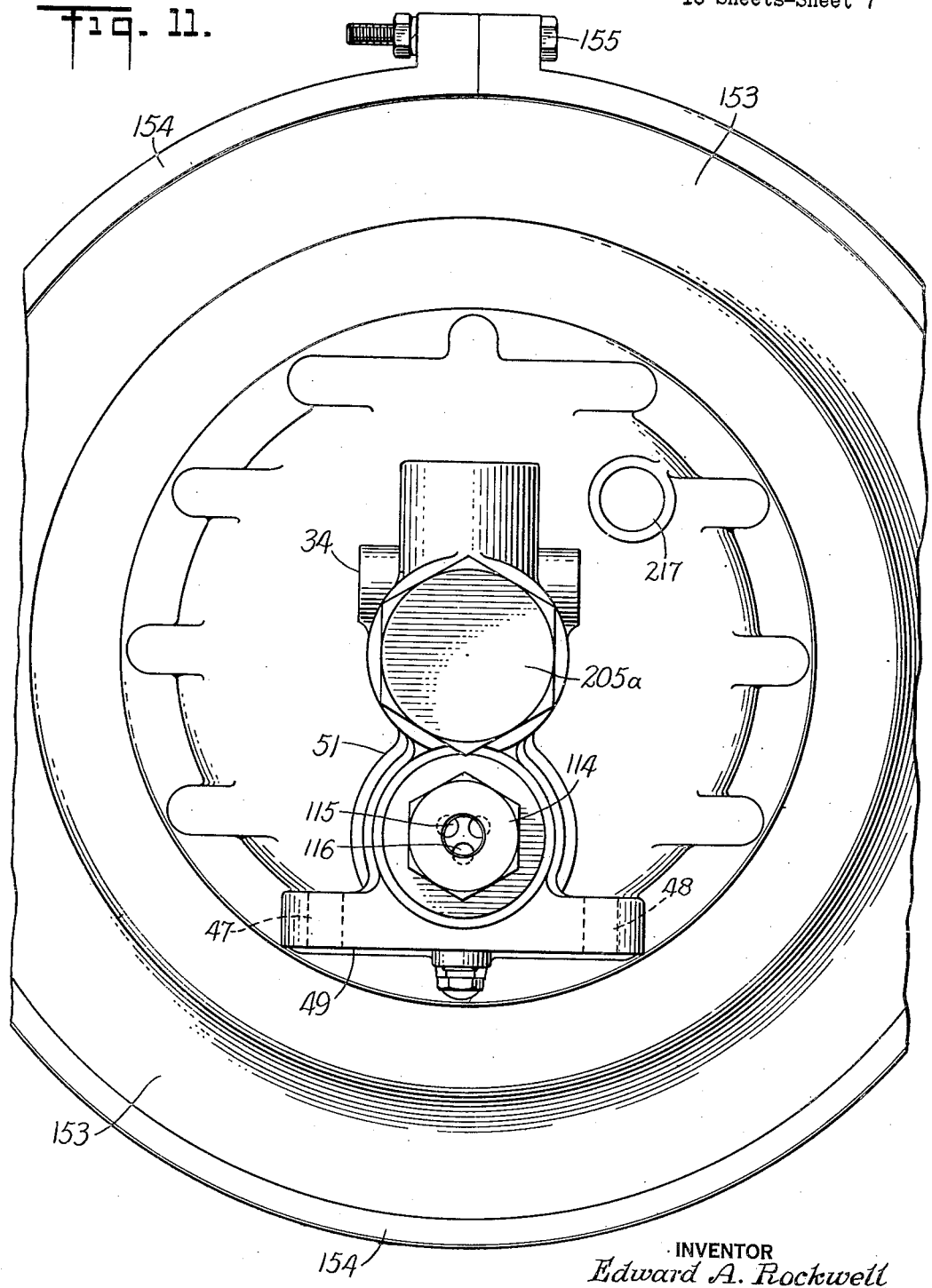

Aug. 14, 1951  E. A. ROCKWELL  2,564,582
INTENSIFIER FOR THE APPLICATION OF POWER
Filed Oct. 20, 1943  16 Sheets-Sheet 8
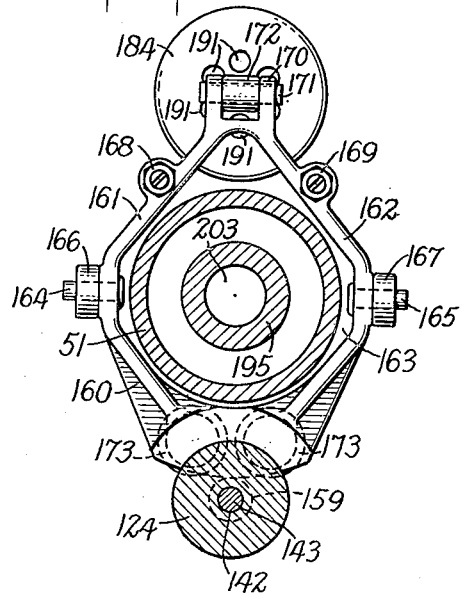
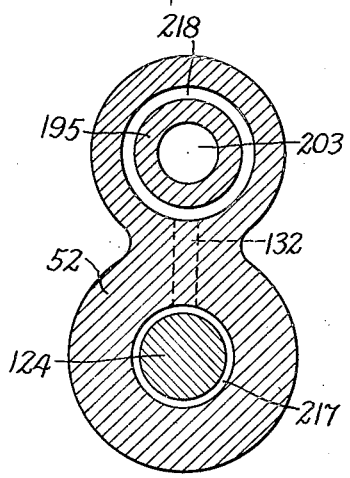
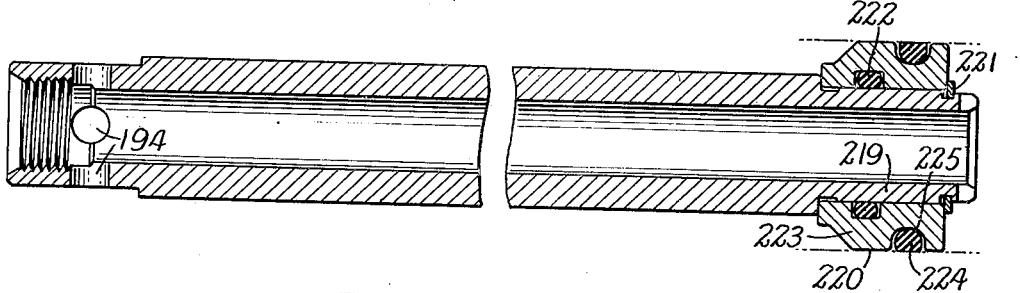
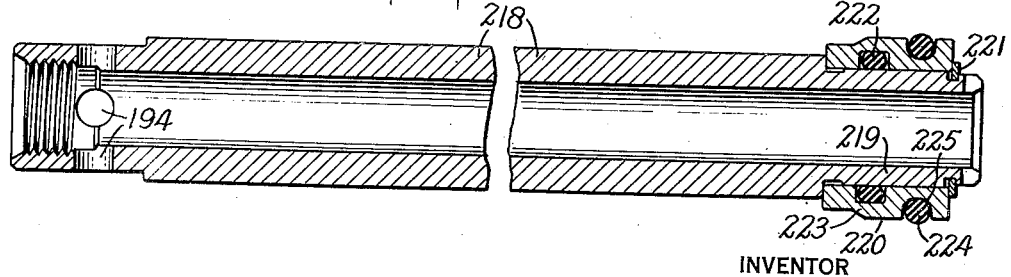
INVENTOR
Edward A. Rockwell
BY
Arthur Wright
ATTORNEY

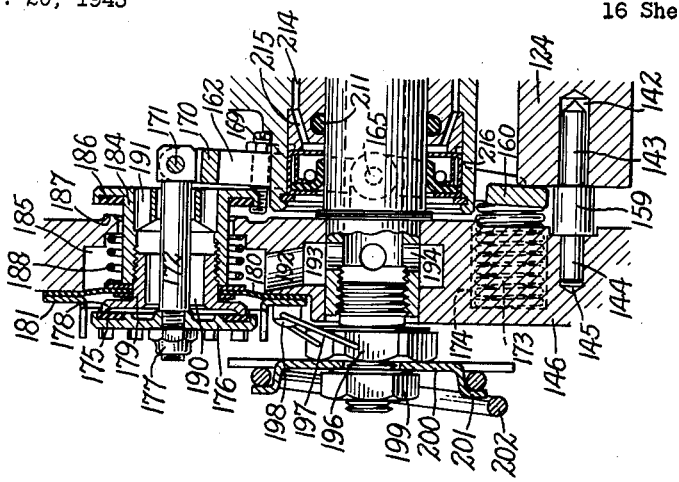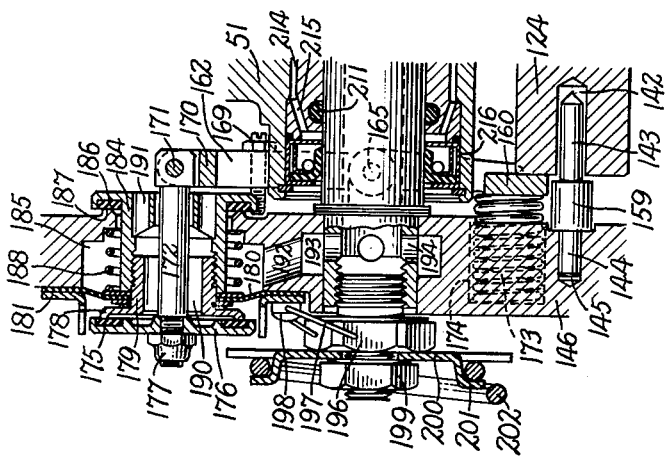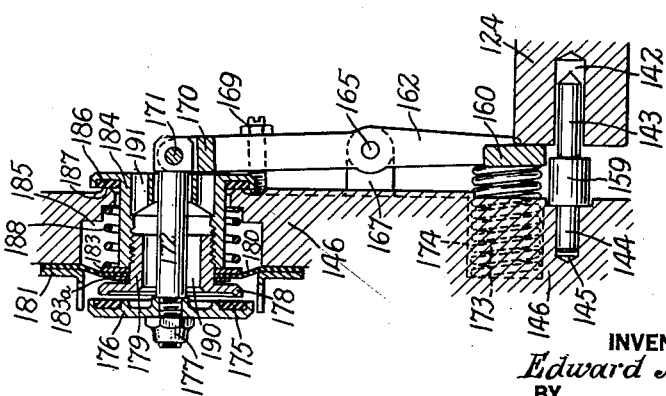

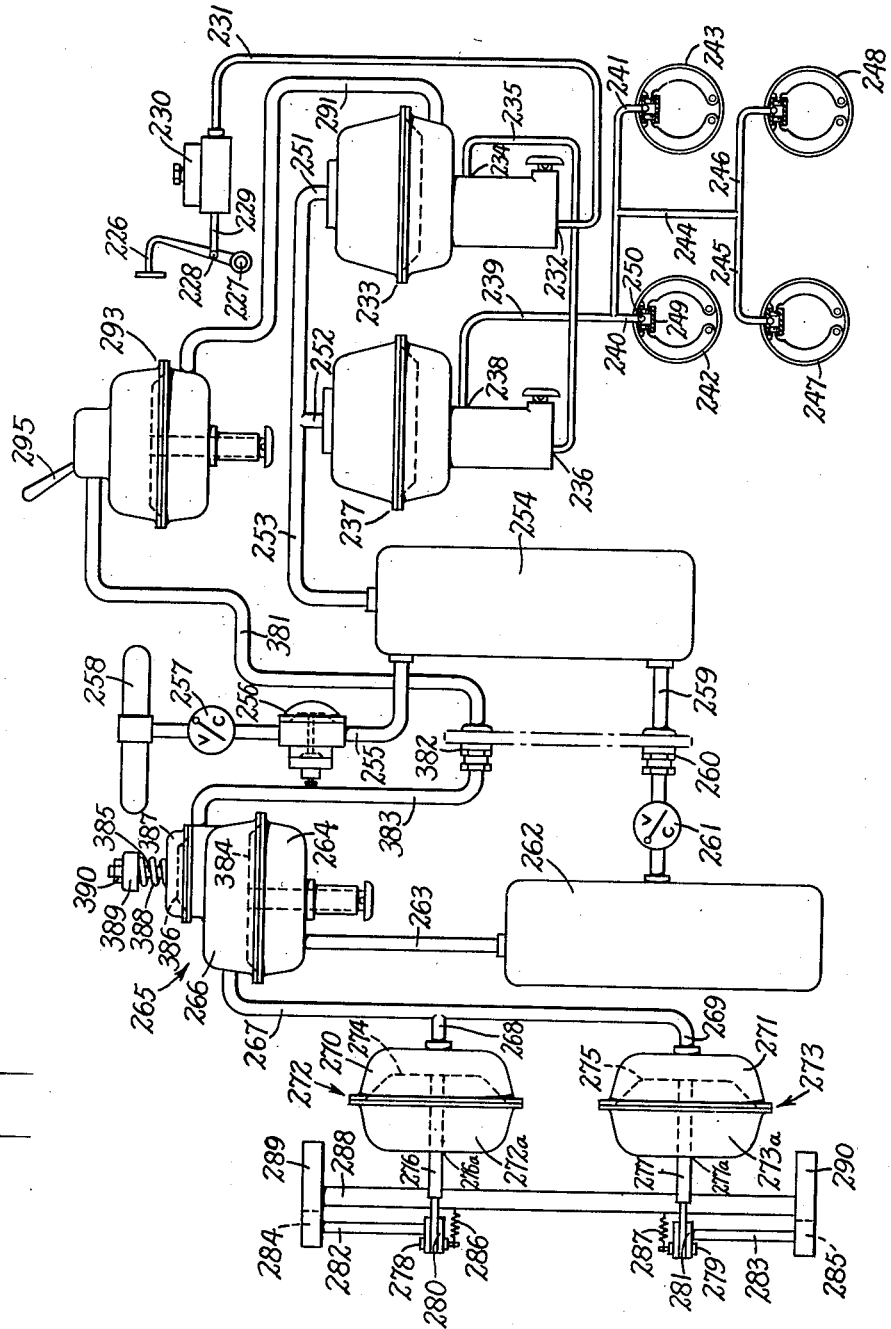

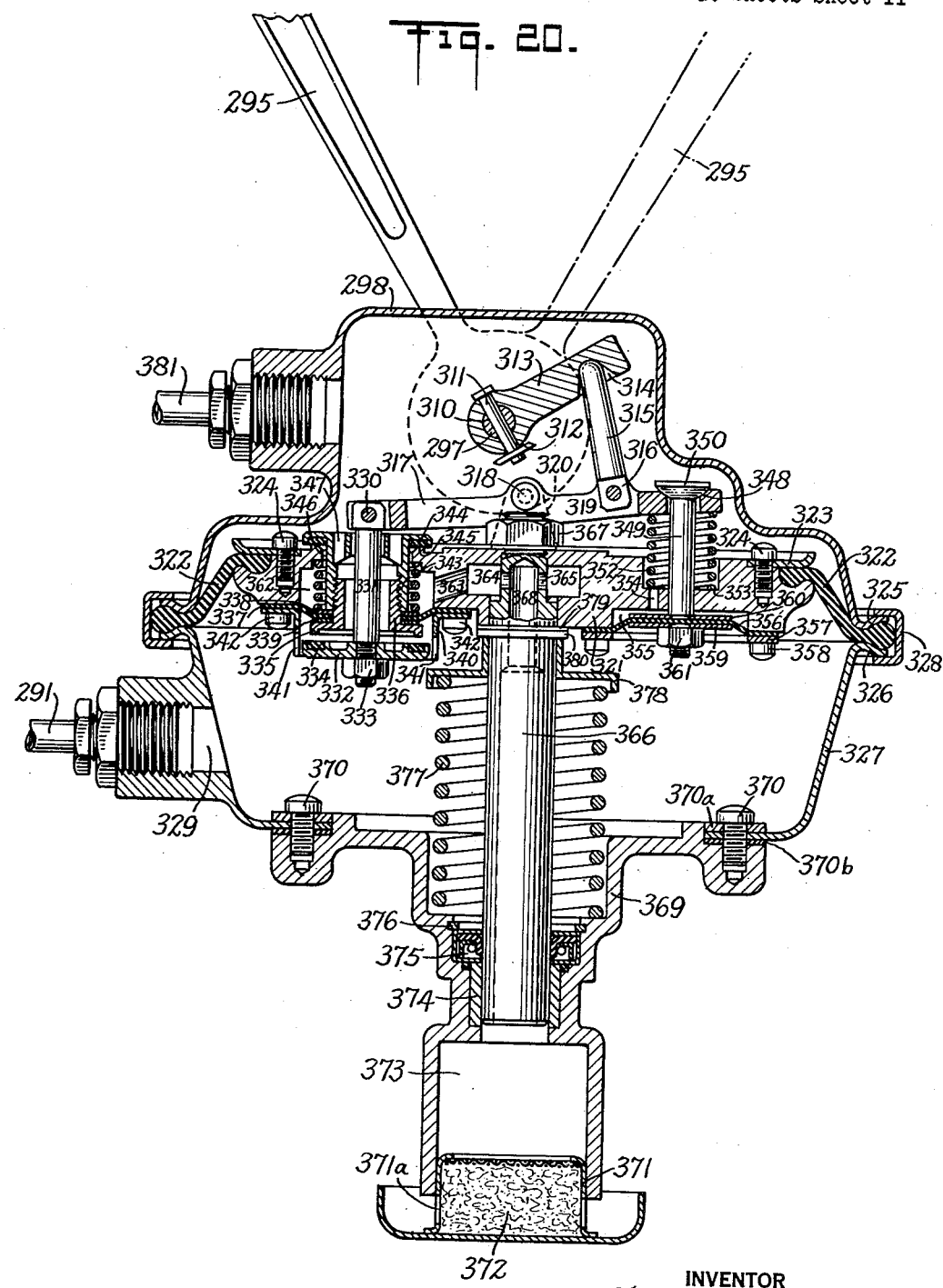

Aug. 14, 1951    E. A. ROCKWELL    2,564,582
INTENSIFIER FOR THE APPLICATION OF POWER
Filed Oct. 20, 1943

INVENTOR
Edward A. Rockwell
BY
Arthur Wright
ATTORNEY

Aug. 14, 1951 E. A. ROCKWELL 2,564,582
INTENSIFIER FOR THE APPLICATION OF POWER
Filed Oct. 20, 1943 16 Sheets-Sheet 13

INVENTOR
*Edward A. Rockwell*
BY *Arthur Wright*
ATTORNEY

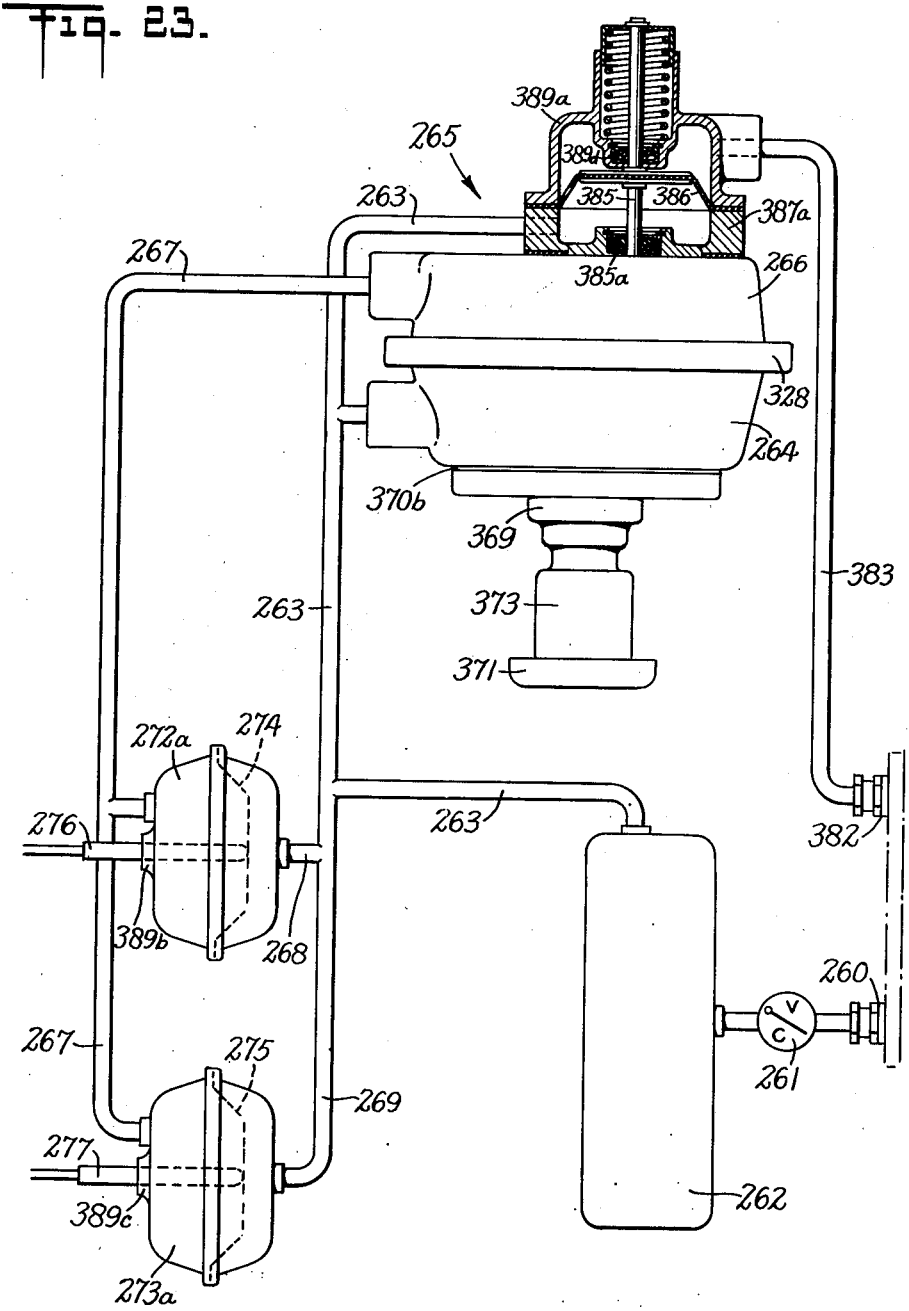

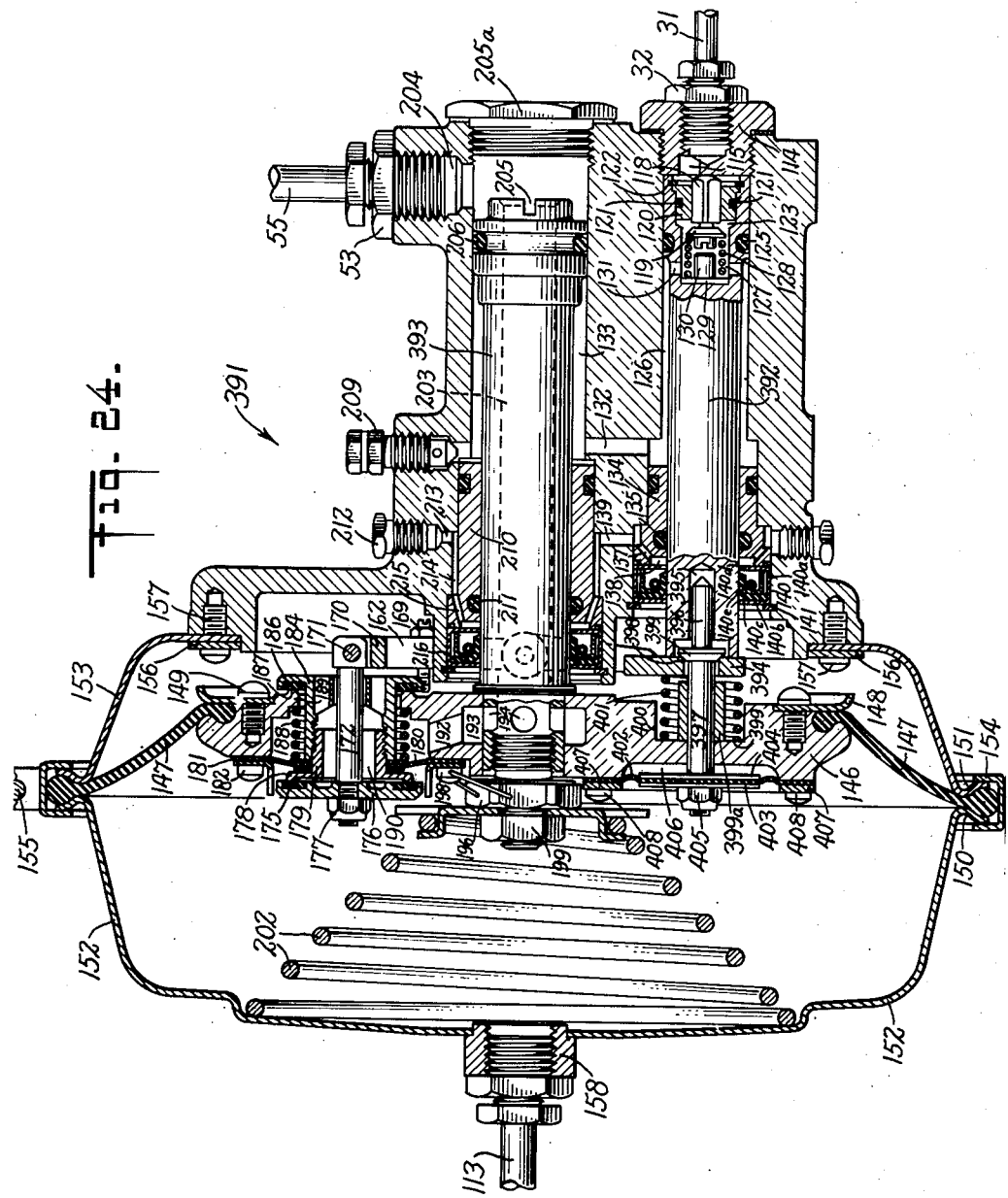

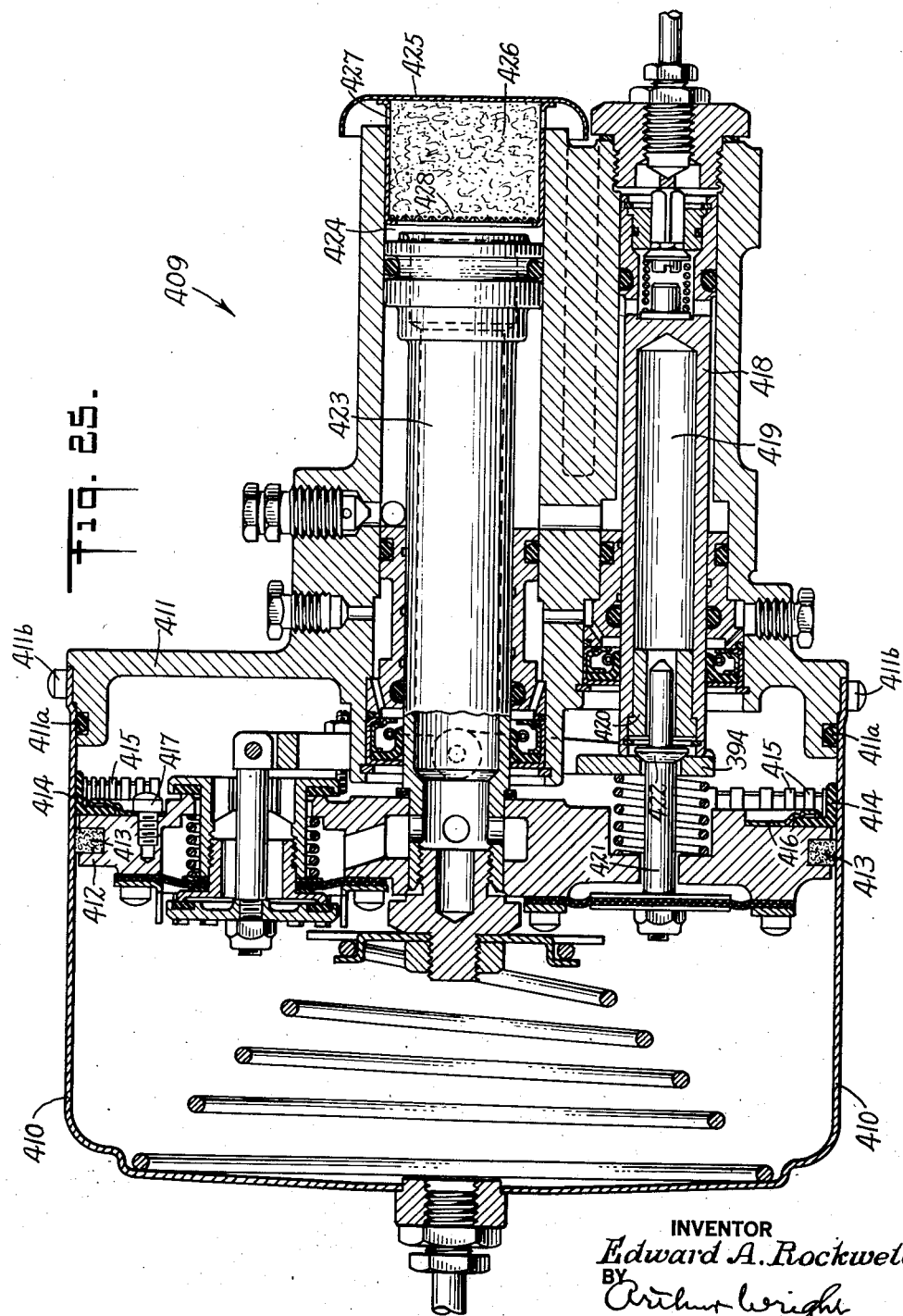

Patented Aug. 14, 1951

2,564,582

UNITED STATES PATENT OFFICE 2,564,582

INTENSIFIER FOR THE APPLICATION OF POWER

Edward A. Rockwell, Cleveland, Ohio

Application October 20, 1943, Serial No. 507,227

7 Claims. (Cl. 60—54.5)

My invention relates to apparatus intended for the application of power for any desired purpose, so as to apply an intensified power thereto, but which is particularly advantageous in connection with the application of power to one or more parts, for example brakes, clutches, transmissions, etc., of automotive vehicles, airplanes, etc.

It is an object of my invention to provide an apparatus for intensifying power, capable of general application, although it is especially applicable, for example, in the operation of automotive vehicles, such as automobiles, airplanes, etc. A further object is to provide an improved form of apparatus of this character over my previous application upon Intensifier Valve, Ser. No. 388,003, filed April 11, 1941, Patent No. 2,398,252, granted April 9, 1946. A further object of my invention is to provide an apparatus of this character so arranged as to enable a greater volume of the hydraulic liquid to be delivered therefrom and with a more compact and short apparatus. Another object is to obtain these results with a larger stroke of the power applying element in the apparatus. Still another object is to operate the said apparatus with a vacuum or other pressure differing from the atmospheric pressure in cooperation with the atmospheric air pressure while lessening the effective volume required, of these pressure media. In other words, in my apparatus the movable wall or diaphragm which is used for applying power is operated in a chamber in which the clearance volume with regard to the diaphragm is reduced. Again, a further object is to provide an effective air bleeding of the seals in the apparatus so as to remove oil vapors, all of the air bleeding passages being connected together. Still another object is to provide an apparatus of this character capable of heavy duty, by utilizing a plurality of power units which are constructed, respectively, so as to obtain a higher degree of efficiency, for example in the operation of the brakes on heavy trucks. By using the two stages a much smaller amount of the vacuum is needed and, comparatively, the volume of the power applying units can be much smaller than in the case of using a single power unit to obtain the desired brake pressures with the needed volume of liquid for operating the brakes. This results in a saving of the accumulated vacuum. When using the two stages, furthermore, the second stage operates, when it cuts in, at the same time or conjointly with the first stage so that power is applied to the brakes simulaneously from both of them.

Another improvement in my present invention over the subject matter of my previous application upon Intensifier Valve, above referred to, is the arrangement of the movable wall or diaphragm in the power units in such a way that the said wall is in effect floated in its retracted position, without resting initially against a positive stop, in order to avoid producing a sudden transition from the setting of the brakes by the manual hydraulic power applied thereto, to the application of the liquid under power to said brakes. This avoids a sudden transition from the movement of the brake shoes by merely the manual means to the power means, which would be perceptible evidencing itself in the form of a "bump" and being detrimental to the nicety of control in the absence of the gradual transition obtained in accordance with my present invention. This is accomplished by producing, as soon as the manual pressure is applied, a small retraction of the power plunger which is immediately taken up thereafter by the first application of the manual pressure. At the same time that the power plunger is retracted in this way, there is also a slight opening of the air valve to admit air in a relatively small amount to one side of the movable wall, which takes place before the liquid-compensating inlet valve in the power unit is closed by the increase of manual hydraulic pressure. A further improvement in my present apparatus is that I obtain a greater sensitiveness in the operation of the apparatus due to not maintaining in the power unit, by means of the master cylinder and double check valve, a constant positive pressure, as has hithertofore been customary. My system is more sensitive as it is not necessary to force the liquid through a double check valve. This arrangement nevertheless, in my present apparatus, permits during the pumping movement of the manual means back and forth, a withdrawal by suction, when necessary, of liquid from the master cylinder into the power unit, owing to the omission from the master cylinder of the double check valve and to the presence in the master cylinder of a rubber lip valve on the master cylinder piston through which liquid can pass to the power unit. In my apparatus, furthermore, I provide for balancing of the valves on the movable wall in a power unit and in a hand controlled vacuum regulating valve as well as in a vacuum controlled relay valve, so that the movement of the wall by differential fluid pressures will not substantially alter the position of the valves into which they have been moved by the manual or other means. My invention also contemplates, not only the use of a movable wall in the power unit in the form of a diaphragm, but instead the substitution of a piston for the same. Also, in constructing the power units which are arranged preferably in two stages, although only one stage may be used if desired, the power plunger may be provided with a removable head for the piston of the plunger, so that, when desired, different piston sizes or pistons made of different materials may be substituted on the plunger. The piston forms a step on the plunger which produces with the cylinder, in which the power plunger is carried, the chamber which forces the liquid under power pressure to the brakes. This arrangement of the chamber is advantageous, owing to the pulling action exerted on the power plunger by the movable wall. In the power units, furthermore, the diaphragm is clamped in place in an advantageous manner by utilizing a clamping ring which exerts a compressing action on the outer edge of the rubber diaphragm in a radial direction, producing a uniformly tight seal of the rubber against the diaphragm casings without the necessity of utilizing a number of screws and so that the diaphragm may be held in place in this way by a clamping ring having a single tightening screw. Furthermore, my invention contemplates the utilization of a suitable vacuum regulating and adjusting valve for controlling the degree of vacuum applied in the operation of the power units. This vacuum regulating valve may be located beyond the vacuum reservoir receiving the vacuum from the engine manifold and in advance of the power unit, but in the case of trailer operation, said valve is preferably located beyond the power unit on the tractor, and for trailer operation there is preferably also a separate vacuum reservoir provided with the same degree of vacuum as from the tractor reservoir and having for the trailer a relay valve which may be controlled, if desired, from a hand valve which regulates the degree of vacuum by the amount of air admitted. The brake operating means may be of the air-suspended type or, if desired, can be of the vacuum-suspended type. In tractor trailer installations, it is very important that the trailer brake be applied immediately before any appreciable braking is secured on the tractor. On slippery roads, and especially coming down grades, if the tractor should come in first on a fast application, the trailer would collide with the tractor and cause what is known as "jackknifing." In other words, the trailer, under severe conditions of this kind, could actually turn the vehicle over. Previously, devices have been known, called synchronizer valves, which boost the speed of operation in the trailer line. It is not necessary to use one of these valves in my two-stage arrangement for the reason that the trailer control line is attached to the first stage which operates before the second stage comes in, thereby assuring the operation of the trailer before the maximum braking is secured on the tractor. Furthermore, in the type of hand valve as well as the vacuum relay valve used in my apparatus, the valves themselves will open wide so as to permit substantially instantaneous application of the trailer brakes, and when the regulated pressures are attained, the particular valve shuts off when the diaphragm reaches its adjusted position.

While my invention is capable of embodiment in many different forms, for the purpose of illustration I have shown only certain forms thereof in the accompanying drawings, in which Fig. 1 is a diagrammatic plan view of an automobile chassis equipped with my apparatus;

Fig. 2 is a side elevation of the same;

Fig. 5 is an end elevation of the first stage intensifier unit and its mounting;

Fig. 6 is a longitudinal section of the check valve used in the apparatus;

Fig. 7 is a vertical section of the vacuum regulator valve;

Fig. 9 is a longitudinal section of the movable parts of the second stage intensifier unit showing the valves in lap position when some pressure is being received from the first stage power unit in Fig. 8;

Fig. 10 is a side elevation of the vacuum regulator valve;

Fig. 11 is an end elevation of the first stage intensifier unit;

Fig. 12 is an underneath view of the valve operating lever used in the first stage intensifier power unit;

Fig. 13 is a vertical section of the second stage intensifier unit;

Fig. 14 is a longitudinal section of the power plunger with a removable head in the first stage unit;

Fig. 15 is a similar view of the power plunger in the second stage unit;

Fig. 16 is a vertical section showing the valve leverage with the vacuum valve open;

Fig. 17 is a similar view of the vacuum and air valves closed;

Fig. 18 is a similar view with only the air valve open;

Fig. 19 is a diagrammatic view of the apparatus as applied to a trailer shown in the position before starting;

Fig. 20 is a vertical section of a vacuum suspended hand valve for independent trailer operation;

Fig. 23 is a similar view of a part of a vacuum-suspended relay valve;

Fig. 24 is a vertical section of a modified form of power unit with a diaphragm for balancing the valves;

Fig. 25 is a similar section of another modified form of power unit using a power piston instead of a diaphragm.

Figure 3:
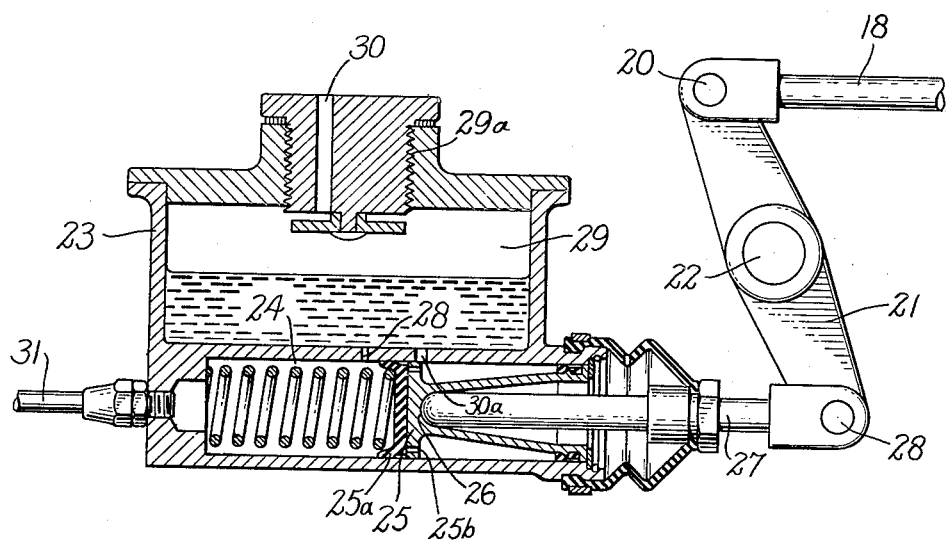
Fig. 3 is a vertical section of the master cylinder used therein.

Referring first to Figs. 1 to 18 of the drawings, I have shown an automobile chassis 1 having front and rear axles 2 and 3, carrying, respectively, four wheels 4 and 5, which are mounted in the usual way on vehicle frame members 6 and 7. Cooperating with each of the said wheels, there is the usual brake operating cylinder 8, having an air bleeder screw 8a, for operating a pair of brake shoes 9 and 10 adapted to coact with a brake drum 10a. Each of said brake cylinders 8 has the usual flexible connection 11 connecting it to a transverse pipe 12 connecting the front or rear sets of brakes with a longitudinal pipe 13 connecting the brake cylinders of the four wheels together. The said pipe 13 has another branch pipe 14 which is provided to receive the hydraulic liquid under pressure for the operation of the brakes.

Figure 4:
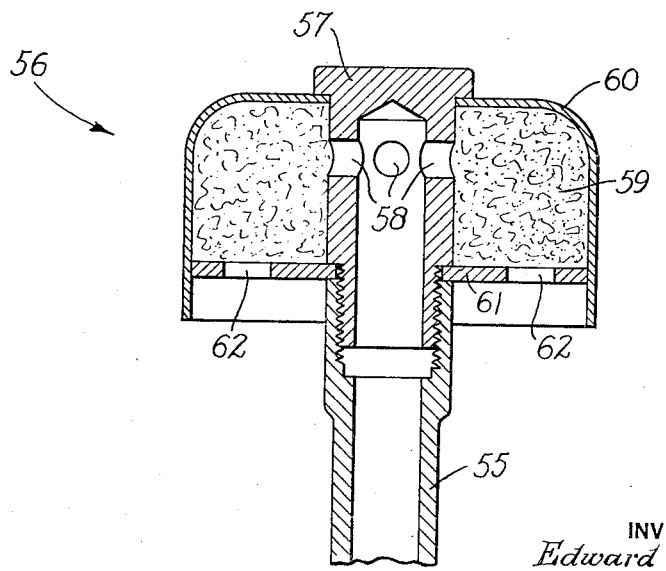
Fig. 4 is a vertical section of the air filter used herewith.

Mounted on the said chassis there is a pedal 15 carried by a pedal lever 16 on a fixed pivot 17 located on the chassis. To the pedal lever 16 there is connected a link 18 by means of a pivot 19 and said link 18 has a pivotal connection 20 to a master cylinder lever 21, carried by a fixed pivot 22, which is connected to a master cylinder 23 of any desired type, and which, for example, has the usual hydraulic cylinder 24 carrying an apertured piston 25, having a 1¾" diameter and a 2½" stroke or any other desired dimensions, provided with the usual rubber seal 25a, which in addition forms a lip valve with holes 25b, connected by a socket 26 to a link 27 and a pivotal connection 28 to the lower end of the lever 21. In its retracted position the piston 25 uncovers a port 28 leading to a reservoir 29 containing the hydraulic liquid, which is received in the reservoir 29 through the usual filling opening 29a having a vented cap 30. A port 30a connects the reservoir 29 to the body of the piston 25. The hydraulic liquid which is forced out of the master cylinder 23 by the piston 25 is delivered by a pipe 31 to an inlet connection 32 connected to a first stage intensifier power unit 33. The liquid from the first stage intensifier power unit is delivered through an outlet connection 34 to a pipe 35 which has a connection 36 for feeding the pressure liquid to a second stage intensifier power unit 37. From the intensifier power unit 37 an outlet connection 38 leads to a pipe 39 connected to the brake actuating cylinders through the pipe 14. It will be understood that in applying these intensifier power units in the installation on the automotive vehicle, either one or both of said power units 33 and 37 can be used alone although the unit 37 is better adapted for this purpose with any appropriate changes in the particular installation. The channel frame member 6 may be provided with two brackets 41 and 42 which are connected by bolts 43 to the channel frame member 6 and these brackets 41 and 42 may be connected by bolts 44 to supporting pads 45 and 46 provided on the intensifier power units 33 and 37, respectively, and having holes 47 and 48 in flat surfaces 49 and 50 on plunger housings 51 and 52 for connecting them to the respective intensifier power units 33 and 37. As shown in Figs. 2 and 4, these plunger housings 51 and 52 have air inlets 53 and 54 which are connected by a T-shaped air inlet pipe 55 to an air cleaner 56 which is comprised of a headed tube 57 screwed into the pipe 55 and having a plurality of air ports 58 communicating with a chamber 59 filled with horsehair carried in a bell-shaped housing 60 which is provided in its lower portion with a retaining plate 61, having air ports 62, the same being designed for retaining the body of horsehair in position. On account of positioning of the hydraulic passages and the air bleeding passages the individual power unit can be placed in the upright positions, as shown in Fig. 2, or in any other anticlockwise position therefrom through an arc of 90° to the position shown in Figs. 8 and 9.

A source of vacuum is provided for the intensifier power units 33 and 37, comprising a pipe 63 connected to an intake manifold 64 of the internal combustion engine 65 which drives the automobile. Said pipe 63 leads to a nipple 66 screw-threaded into a check valve housing 67 having a check valve 68 therein with notches 69 around the edge thereof and which is adapted to seat against a valve seat ring 70 carried by said casing 67. This casing has screw-threaded therein a nipple 71 to which there is connected a pipe 72 having a connection 73 to a vacuum reservoir 74, which in turn has a connection 75 to a pipe 76. The pipe 76 has a connection 77 which joins the same to an inlet opening 78 in casing 79 of an adjustable vacuum-regulating or reducing valve, see Figs. 7 and 10. This valve casing 79 has an annular support 80 for a diaphragm cover 81 having a vent opening 82. Around the edge of the cover 81 there are a plurality of screws 83 which pass through said cover and into the annular support 80 so as to clamp in place a flexible diaphragm 84 of any suitable rubberized fabric or material. At the center of the diaphragm 84 there is an opening 85 to support a transverse rod 86, one end 87 of which is located in the opening 82 and is provided with a screw-thread 88 carrying a nut 89 to hold in place clamping plates 90 and 91 on opposite sides of the diaphragm 84. The clamping plate 91, furthermore, has bonded to the inner face of the same a synthetic rubber valve ring 92 which is adapted to seat on a valve seat 93 formed on a web 94 of the casing 79 which extends downwardly and to the right in Fig. 7 to form the valve seat 93. A retaining plate 95 for the valve ring 92 is supported against a shoulder 96 on the rod 86. The left hand end of said rod 86 has a shoulder 97 to support clamping plates 98 and 99 for a diaphragm 100 which is clamped against said shoulder 97 by a nut 101 on the rod 86. The periphery of said diaphragm 100 has a gasket 102 on the same which holds the diaphragm 100 in place by an annular screw 103. Said screw 103 is internally screw-threaded to receive an adjusting screw 104 having a central hole 105 into which the left end of the rod 86 passes. This hole 105, furthermore, leads to a spring chamber 106 in which there is a spring 107 for pressing the valve 92, 93 normally into an open position. Said spring seats at its left end against a shoulder 108 and at its other end against the nut 101. A lock nut 109 holds the adjusting screw 104 in its adjusted position. By this arrangement the spring 107 tends to hold the valve 92, 93 open. Also, the air pressing on the diaphragm 100 balances the vacuum exerted on the valve ring 92. However, the arrangement is such that, as the diaphragm 84 is subject to the air pressure on one side and the vacuum on the other side, this prevents exceeding the desired maximum vacuum, according to its adjusted position, so that the vacuum will not be too great and so as not to exceed the maximum brake line pressure. The vacuum transmitted through the valve casing 79 is communicated by an opening 110 to a pipe 111 and thence by branch pipes 112 and 113 to second stage and first stage intensifier power units 37 and 33.

Figure 8:
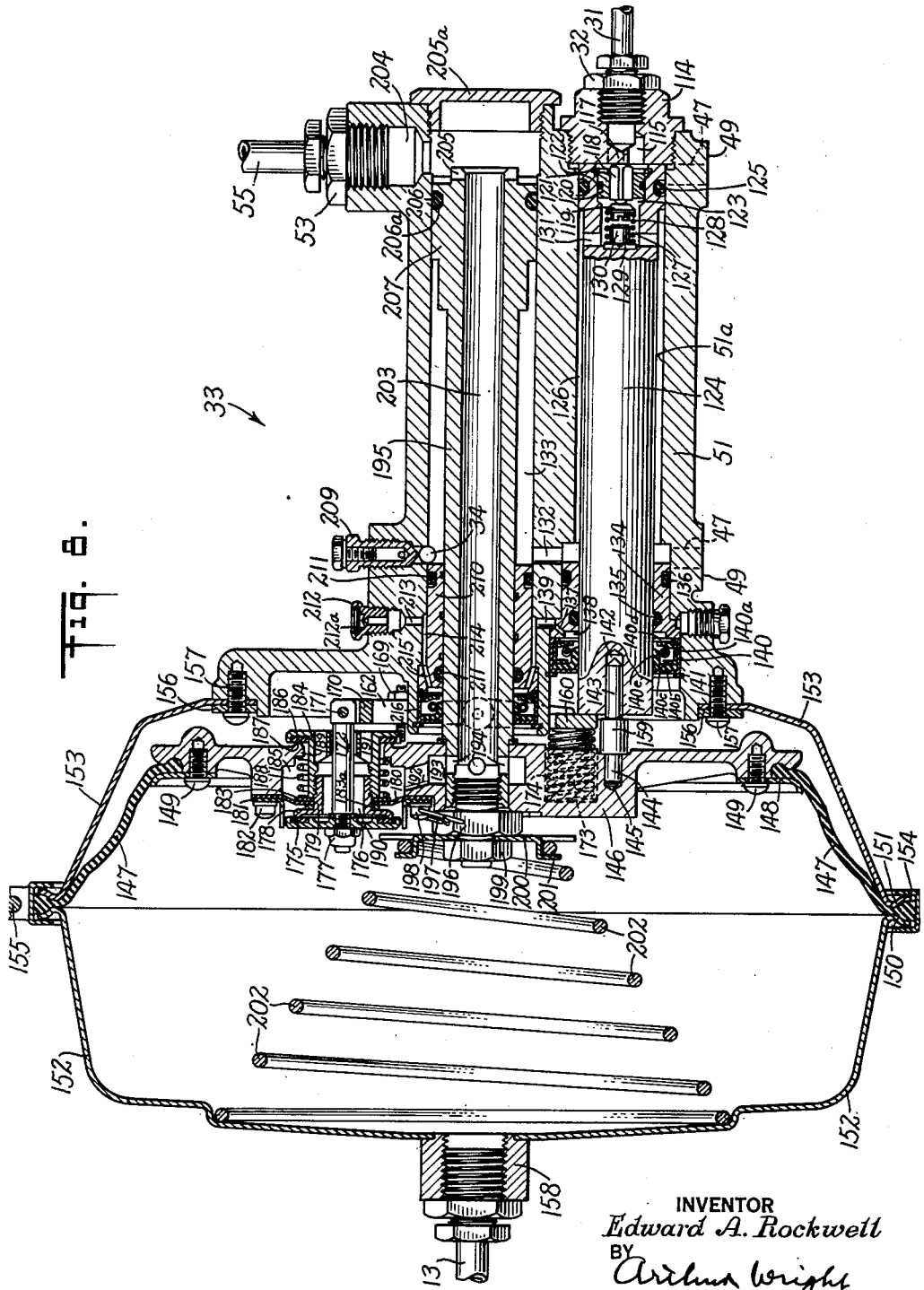
Fig. 8 is a longitudinal section of the first stage intensifier unit showing the valve positions before the application of manual pressure but with the vacuum present.

The construction of the first stage intensifier power unit on servo pulsator generator power unit 33 is shown in Figs. 5, 8, and 11. This power unit is comprised of a first pulsator pressure generator including a housing 51 having a cylindrical bore 51a and an inlet 32, leading to and from the master cylinder 23. This inlet is located in a screw plug 114 provided with a series of inlet openings 115 between which there is a portion 117 acting as a stop for the end of a valve plunger 118 which has a tapered disk-like valve 119 thereon cooperating with a valve seat ring 120 provided with an annular seal 121 and held in place by a split ring 122 located in a recess in a longitudinal valve chamber 123 within the terminal portion of a modulating valve control plunger 124. This plunger is enlarged at the outer terminal to provide a first pulsator pressure generating piston having a peripheral seal 125 to seal the master cylinder applied liquid from the annular chamber 126 formed between plunger 124 and the surrounding cylinder 51 when valve 119 is in closed position. The longitudinal valve chamber 123 communicates with a smaller valve chamber 127 leading to the annular chamber 126. In the valve chamber 127 there is provided a light spring 128 resting against a shoulder 129 in the chamber 123 for normally pressing the valve 119 towards its closed position. A boss 130 retains the spring 128 in place. A series of radial passageways 131 lead from the left hand end of the valve chamber 123 to the annular chamber 126 for the passage of liquid when valve 119 is open. Annular chamber 126 communicates through a passageway 132 with a second pressure generator including a second chamber 133 in which a second motor driven piston 207 having an effective surface area which functions as a servo pulsator piston generator to supply volume at the pressure generated by the piston surface of said first generator piston 124 and thus reduce the required travel of the latter.

The plunger 124, at its left end, is guidably supported by a bushing 134, having inner and outer seals 135 and 136, said bushing having a series of diagonal air passageways 137 which connect an annular recess 138 in the face of the bushing with an air passageway 139 in the plunger housing 51. The recess 138 communicates with an annular packing chamber 140 which may contain any desired arrangement, such for example, as a retainer ring 140a, a leather seal 140b, a supporting ring 140c and a washer 140d. The lip of the leather seal 140b is held in place by a garter spring 140e. Also, a split ring 141 is located in an annular recess in the chamber 140. Formed in the inner terminal of control plunger 124 is a cylindrical guide recess 142, in which there is loosely received in guiding relation one end of a flanged rod 143 acting as an aligning indexing pin, provided with a dowel and stop member 144 tightly pressed into a recess 145 in a diaphragm clamping plate 146. In this way, the plunger 124 is accurately positioned with regard to the diaphragm clamping plate 146. This is an aid in the assembly as the pin 143 restores the correct radial positions of the parts when being assembled. The plate 146 has clamped around the periphery of the same a diaphragm 147, of rubber or other flexible material, by means of a clamping ring 148 and screws 149. The outer periphery of the flexible diaphragm 147 is located between flanges 150 and 151 on angularly-dished diaphragm casing members 152 and 153 and outside the flanges 150 and 151 there is a split ring-shaped rectangular channel member 154, the free ends of which are fastened together by a bolt 155. By using the rectangular form this produces an inward radial pressure on the rubber which spreads the rubber transversely producing a tight seal without danger of pinching off the edges of the rubber. It will be noted that the inner face of the casing member 153 is fastened to the housing 51 by means of a clamping ring 156 and screws 157. It will, also, be noted that the other diaphragm casing member 152 has a screw-threaded coupling 158 for connection with the vacuum inlet pipe 113.

The control plunger guide pin 143 has an annular stop flange 159 seating on the diaphragm clamping plate 146. Adjacent to the other terminal of stop flange 159, the end of control plunger 124 engages one end of a modulating valve operating lever 160. This lever 160 has two outwardly bowed portions 161 and 162 to provide a central opening 163, see Fig. 12. At the widest portion of opening 163 the bowed portions 161 and 162 are provided with pivot pins 164 and 165 which pass through supporting ears 166 and 167 extending from the diaphragm clamping plate 146. Valve operating lever 160 carries screws 168 and 169 adapted to act as adjustable stops in the movement of the valve lever 160 against the face of the clamping plate or diaphragm hub or clamping plate 146. It will be noted in Fig. 12 that these screws 168 and 169 can be adjusted from the underneath side of said lever. Furthermore, at the other or work performing end of the lever 160 there is a bifurcated portion 170 to receive a pivot pin 171 for connection to a reciprocable valve plunger rod or stem 172 of the air and vacuum modulating valve assembly for controlling the admission and exhaust of atmospheric air to operate the diaphram 147.

The end of the lever 160 which is contacted by the control plunger 124 rests against two relatively light springs 173 carried in recesses 174 in the diaphragm clamping plate 146 functioning to normally restore the position of the valve operating lever 160 when not being operated by control plunger 124. However, when the control plunger 124 is being moved by the admission of pressure liquid through the inlet port 32 from master cylinder 23 this results in the movement of the modulating valve plunger 172 to the right in Fig. 8 which accordingly moves an annular synthetic rubber vaccum valve ring 175 to the right. Vacuum valve seat 178 for vacuum valve 175 is carried on a screw plug 179 mounted on a small flexible diaphragm 180 of rubberized fabric or any other desired material, which is fastened to the left face of the diaphragm clamping plate 146 by means of a clamping and valve guiding ring 181 and screws 182. This diaphragm 180 is clamped on the screw plug 179 between washers 183 and 183a carried on a tubular valve member 184 which passes through an opening 185 in the clamping plate 146. The tubular valve member 184 has bonded on its inner face a synthetic rubber valve ring 186 which cooperates with an annular valve seat 187 on the clamping plate 146. A valve spring 188 carried between the washer 183 and a shoulder 189 in the opening 185 normally keeps the valve ring 186 seated and the valve ring 175 is kept off its seat by the springs 173 so as to admit the vacuum to both sides of the diaphragm 147 through a passageway 190 in the screw plug 179 and openings 191 in the valve ring member 184. The opening 185 communicates by means of an oval passageway 192, the narrow dimension of which is shown in the drawing, with an annular chamber 193 which in turn communicates with holes 194 in a tubular power plunger 195, which passes through the diaphragm supporting plate 146 and is secured thereto by a nut 196 located in place by a wire binding 197 passing through the nut 196 and through a screw 198. On the extreme end of the second generator plunger 195 there is a nut 199 which holds in place a plate 200 having up-turned ears 201 for holding in place one end of a coil compression motor spring 202, the other end of which is supported from the inner face of the diaphragm casing member 152. This compression motor spring serves a very important function to be described in connection with effecting a smooth transition from the condition of operation whenever transition valve 119 is open allowing flow from master cylinder 23 to and from the brake cylinders, to the condition of operation wherein transition valve 119 is closed and the servo pulsator generator unit 33 is delivering an amplified pressure to the brake cylinders.

The tubular plunger 195 has a longitudinal passageway 203 for conveying air through the ports 194 to the right face of the diaphragm 147 from an air inlet 204 connecting with the pipe 55. The said tubular plunger 195, furthermore, has at its right hand end, in Fig. 8, a recess 205 for a spanner wrench for assembly purposes in the assembly of the plunger 195 with the plate 146 and the chamber at the right end of the plunger 195 is closed by a screw cap 205a. Also near this end there is an annular seal 206 in a recess 206a, which may be rounded as shown in Figs. 14 and 15, adjacent to a piston head 207 on the plunger 195 which operates in the high pressure chamber 133, the left end of which terminates in the outlet 34 for delivery to the brake cylinders of pressure generated by the effective area. Adjacent the said outlet 34 there is an air bleeder screw 209 of any desired type. Furthermore, adjacent to the said outlet 34 there is a bushing 210 for the plunger 195 having rubber seals 211. Above the said bushing 210 there is a screw plug 212 having therein a porous plate 212a to permit the access or escape of small amounts of air or to prevent the accumulation of hydrocarbon fluid which might occur due to the possible passage of hydrocarbon vapors from the seals, coming from the intake manifold. For this purpose the plug 212 communicates with a hole 213 leading to an annular chamber 214 connected by inclined passageways 215 to an annular sealing chamber 216, containing the same kind of sealing elements as the chamber 140, around the plunger 195 and which in turn communicates with the passageway 139. This also prevents the accumulation of liquid which might pass through the seal 211 towards the left in Fig. 8. Also, the diaphragm casing has an opening 217 normally closed by a plug which may be connected to any trailer, and, if desired, in the same manner as shown in my copending application Ser. No. 397,899, filed June 13, 1941, now Patent No. 2,305,638, for operating power operated trailer brake devices. This is preferably on the first stage unit where a two stage power equipment is used, in order to avoid lag in the operation of the trailer.

The second stage intensifier power unit which is shown in Figs. 1, 9 and 14, is constructed in substantially the same manner as the first stage intensifier power unit except for differences in sizes and proportions of certain parts thereof to be pointed out. It will be noted, for example, referring to Figs. 8 and 9, that the diameter of the power plunger chamber 133 in the first stage unit 33 is larger than that of the second stage intensifier power chamber 218. Also, the springs 173 in the first stage power unit 33 are lighter springs than springs 173a in the second stage power unit 37. If desired, these springs on the second stage power unit 37 could be made lighter so as to use this unit as a single stage power unit. The proportions are chosen to obtain the maximum performance from the two stage operation and for this purpose the volumes of the master cylinder and the two cylinders on each of the two intensifier power units are chosen with this end in view. In each of the two stages of the intensifiers, the volume displacement in the movement of the manually actuated plunger plus the volume displacement in the movement of the power actuated plunger is equal to the volume displacement of the master cylinder liquid in the power unit. Therefore, in the operation of the brakes, the pistons in the slave cylinders on the brake travel the same distance when actuated, whether power is being applied or the pressure is being generated entirely manually by the master cylinder piston. It is to be understood, however, that, instead, different volume displacements could be used according to the different requirements in the operation of the brake drums and the different pedal pressures desired.

By the operation of the power units of these two stages a pressure of at least 1450 lbs. and even up to 1700 lbs., per square inch or higher, for example, will be delivered from the second stage outlet 38 when 200 lbs. pressure per square inch is delivered to the first stage inlet 32 and when a manual pressure of approximately 150 lbs. is applied to the pedal. Furthermore, as to each of these power units and both of them when operated together, it is found that the same ratio of master cylinder pressure or force to brake-pressure or force is obtainable with the different amounts of manual pressure applied and, in fact, that this ratio is substantially the same irrespective of changes of vacuum in the vacuum reservoir 74 over wide ranges of vacuum. However, the amount of vacuum, of course, varies the maximum pressure or force obtainable. In other words, the force is applied to the brakes in a definite ratio to the manual force applied and power means is applied to supply the needed power to progressively restrict the path of movement of the manual means to avoid the necessity of a long range of path of manual movement. Also, in the operation of the brakes the full amount of the foot pressure is used and applied to the brakes and the power merely adds to this an amount of work needed to operate the second servo pulsator generator piston to attain the desired braking pressure while avoiding the necessity of a long path of movement of the manual means. I prefer that the second stage operation not become effective until the brakes have been set or engaged by the first stage unit. Also, the ratio of the input of manual force applied to the output of force that is applied to the brakes remains substantially constant throughout the range of manual pressures applied both in the on and off-modulation. Furthermore, the foot always does a given maximum of input work for any given amount of output work and substantially irrespective of the amount of vacuum applied and utilized.

In Figs. 14 and 15, respectively, I have shown modified forms of power plungers for the first and second stage power units. This involves merely providing removable heads, which may be replaced by heads of different dimensions and materials for power units of different sizes and requirements, as desired. As those removable heads are the same in principle for the two units 33 and 37 I will describe in detail only the one that may be used on the first stage power unit 33.

In this instance, I have provided a plunger rod 218 having a reduced end 219 having a piston head 220 held in place by a split ring 221. An internal rubber sealing ring 222 is provided in a recess 223 and an external rubber sealing ring 224 is provided in a recess 225 rounded circularly at the bottom, and so arranged that when the seal is in position with the piston 218 in its cylinder the ring 224 will be slightly flattened radially but there will still be clearances on both sides thereof with regard to the recess 225, but no clearance at the bottom of the recess 225. This type of seal is especially advantageous between moving parts and could be mounted on a stationary part to seal a moving part as in Figs. 17 and 18, or vice versa.

In Fig. 19 I have shown a modification of my invention, adapted for use on trailers. In this figure I have shown diagrammatically the system as applied to a tractor and trailer, the dotted and dash lines shown in the middle of said figure indicating the line of separation of the tractor located at the right thereof and the trailer located at the left of the same. For this purpose, I have shown a pedal lever 226 mounted on a fixed pivot 227 on the chassis of the tractor. The pedal lever 226 is connected by a pivot 228 to a piston rod 229 of a master cylinder 230 constructed in the usual way, such, for example, as shown in Fig. 3 hereof. The master cylinder 230 is connected by a pipe 231 to an inlet 232 of a first stage power unit 233 which may be constructed the same way as the power unit 33 previously described, see Fig. 8. The power unit 233 has an outlet 234 for the hydraulic liquid, which is conveyed by a pipe 235 to an inlet 236 on a second stage power unit 237 which may be constructed the same as the power unit 37 previously described, see Fig. 9. The said second stage power unit 237 has an outlet 238 for hydraulic liquid, which is conveyed by a pipe 239 having branch pipes 240 and 241 leading to a pair of front wheel brakes 242 and 243, and the branch pipe 241 has a further branch pipe 244 leading to branch pipes 245 and 246 which are connected to rear wheel brakes 247 and 248. Each of the wheel brakes 242, 243, 247 and 248 has the usual wheel brake cylinder 249 provided with an air bleeder screw 250. The vacuum is supplied to the first stage power unit 233 and the second stage power unit 237, respectively, by pipes 251 and 252 which are connected by a pipe 253 to a tractor vacuum reservoir 254 which is supplied with vacuum by a pipe 255 leading to a vacuum adjusting valve mechanism 256 which is constructed the same as the vacuum adjusting valve 79 previously described and as shown in Figs. 7 and 10 hereof. The vacuum adjusting valve 256 leads to a check valve 257 which in turn is connected to an engine manifold 258. The said tractor reservoir 254 is, furthermore, connected by a pipe 259 to a detachable coupling 260 on the rear of the tractor and which is connected by a check valve 261 to a trailer vacuum reservoir 262. The trailer vacuum reservoir 262 leads by a pipe 263 to a lower diaphragm casing 264 of a vacuum relay valve 265 which has an upper diagram casing 266 connected by a pipe 267 provided with branch pipes 268 and 269 leading, respectively, to forward diaphragm housings 270 and 271 of diaphragm-operated vacuum power units 272 and 273 provided with abutting rear diaphragm housings 272a and 273a. These units 272 and 273 are provided with flexible diaphragms 274 and 275, between the housings 270 and 272a and 271 and 273a, which are connected, respectively, to rods 276 and 277 passing through vents 276a and 277a. These rods 276 and 277, at their rear ends, are connected to pivots 278 and 279 on levers 280 and 281 located on cam shafts 282 and 283 having cams 284 and 285 to operate the pairs of brake shoes, which are provided for the wheels of the trailer. Pull-back springs 286 and 287 connect the levers 280 and 281, respectively, to an axle 288. Brake shoes 289 and 290 are provided for cooperating with brake drums (not shown) and in which the cams 284 and 285 are mounted. The vacuum which is applied by the pipe 267 for operating the diaphragms 274 and 275, is supplied by the pipe 263. This can be controlled by the vacuum or air leading from the lower diaphragm housing of the first stage power unit 233 to the lower portion of a hand valve 293 for independent trailer operation.

Figure 21:
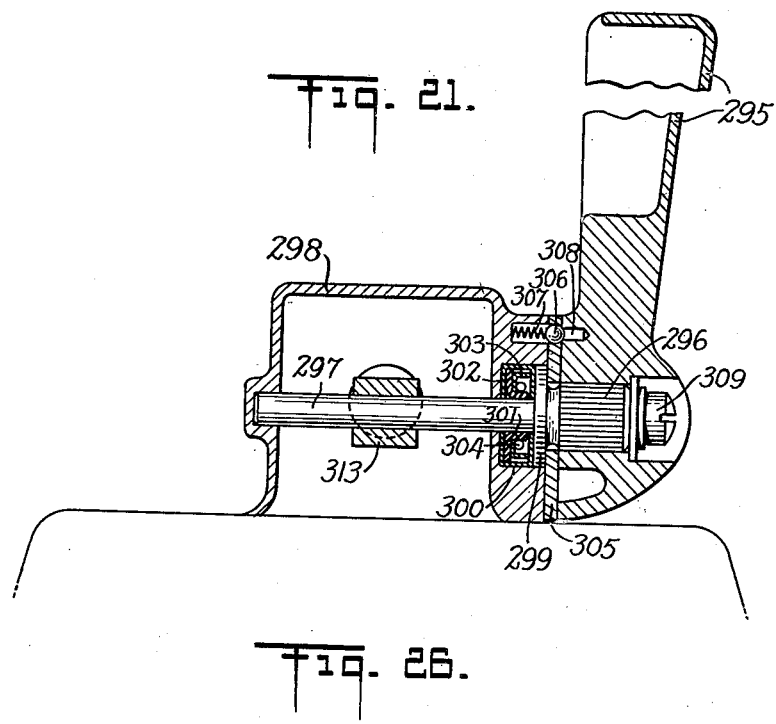
Fig. 21 is a vertical section of the same valve taken at right angles to Fig. 20.

The hand valve 293 as shown in Figs. 20 and 21 has an operating handle 295 located on a splined end 296 of a shaft 297, which is pivotally supported in an upper diaphragm housing 298. For this purpose the shaft 297 has a flange 299 which is adjacent to a sealing chamber 300. The sealing chamber 300 has a leather seal 301 therein within a U-shaped retaining ring 302, there being provided within the ring 302 an angularly shaped ring 303 which holds the leather seal 301 in place, a garter spring 304 being provided for retaining the lips of the seal 301 in position. Outside of the flange 299 there is a washer 305 having a hole for receiving a ball 306 which is pressed by a spring 307 into any one of a succession of recesses 308 carried by the handle 295. A screw 309 holds the lever 295 on the shaft 297 and the washer 305 can be fastened to the diaphragm housing 298 in any desired manner. Within the diaphragm housing 298 the shaft 297 has an opening 310 through which a pin 311 passes, having a cotter pin 312 to hold the lever 313 in place on the shaft 297. The said lever 313 has a tapered recess 314 in its end to receive the end of a link 315 carried on a pivot 316 of a rocking lever 317, connected by a pivot 318 to bearings 320 located at the sides of a diaphragm clamping plate 321. Said clamping plate 321, at its periphery, clamps in position the inner periphery of a rubber diaphragm 322 with the aid of an upper clamping plate 323 and screws 324. The outer periphery of the diaphragm 322 is clamped between a flange 325 on the upper diaphragm housing 298 and a flange 326 on a lower diaphragm housing 327 by means of a U-shaped channel ring 328 which may have a clamping screw similar to the clamping screw 155 previously described. An inlet 329 connects the lower diaphragm housing 327 to the pipe 291. The said valve lever 317, at one end, has a pivot 330 connecting it to a valve stem 331, to the lower end of which there is attached a valve plate 332 by means of a nut 333, said valve plate 332 carrying a rubber valve ring 334. The said valve ring 334 cooperates with a valve seat 335 to act as a vaccum valve, said valve seat 335 being carried by a valve sleeve 336 having mounted thereon a subsidiary diaphragm 337, between washers 338 and 339, the outer periphery of which is clamped against the under-face of the diaphragm clamping plate 321 by means of a clamping ring 340 having guide fingers 341 and secured in place by screws 342. The said valve sleeve 336 is, furthermore, screw-threaded to an outer valve sleeve 343 carrying a rubber valve ring 344 which seats on a valve seat 345 to form an air inlet valve which gives access of the air to the upper diaphragm housing 298 through a passageway 346. The outer valve sleeve 343, furthermore, has holes 347 for the passage of the vacuum between the diaphragm housings 298 and 327. At the other end of the lever 317 there is a socket 348 for receiving a rod 349 having a flanged upper end 350. Around the rod 349 there is located a spring 352 seating against the under-face of the lever 317. The lower end of the spring 352 presses against a shoulder 353 in the clamping plate 321 and adjacent to the said shoulder 353 there is a passageway 354 communicating with a diaphragm chamber 355. This diaphragm chamber 355 is closed by a diaphragm 356, the outer periphery of which is secured by means of a ring 357 and screws 358 to the under-face of the clamping plate 321. The inner periphery of the diaphragm 356 is carried between washers 359 and 360 on the lower end of the rod 349 where it is held in place by a nut 361. Above the subsidiary diaphragm 337, there is an air chamber 362 which is connected by a passageway 363 to an annular air chamber 364 in the clamping plate 321. The air is conveyed to the chamber 364 by holes 365 in a plunger 366, the upper end of which passes through the clamping plate 321 and is secured thereto by a nut 367. A longitudinal passageway 368 in the plunger 366 connects the openings 365 with the outer air through an extension 369, secured by screws 370 to the lower diaphragm housing 327, with the aid of a clamping ring 307a and a gasket 370b, the said extension 369 being provided with an air filter 371, having air ports 371a, and filled with horsehair 372 within an air inlet chamber 373 therein. A bushing 374 is provided around the lower end of the plunger 366 and adjacent to the bushing 374 there is a packing chamber 375 containing the same kind of sealing elements as in the case of the chamber 140. A split ring 376 holds these sealing elements in place. Furthermore, around the plunger 366 there is a spring 377 supported within the extension 369, the upper end of said spring 377 being supported in a retaining sleeve 378 mounted against washers 379 and 380, supported against the under-face of the clamping ring 321.

Figure 22:
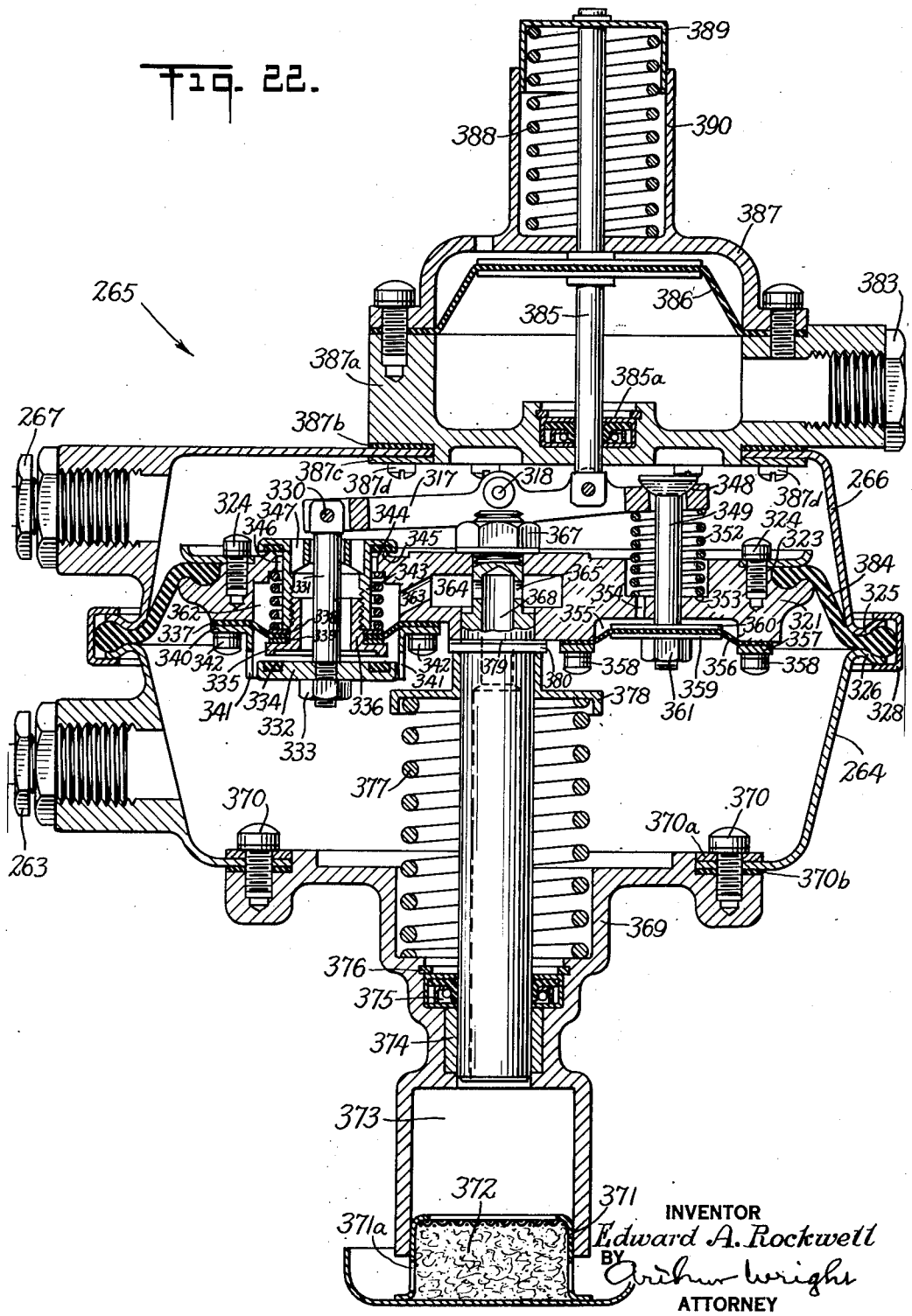
Fig. 22 is a vertical section of an air-suspended relay vacuum regulating valve.

The upper diaphragm housing 298 is connected by a pipe 381 to a detachable coupling 382 leading to the trailer and which in turn is connected by a pipe 383 to the upper diaphragm housing 266 of the relay valve 265, see Fig. 22. This relay valve 265 has therein a diaphragm 384 and parts mounted thereon and connected thereto just as in the case of the vacuum regulating valve device 293 with the following differences. In this instance, instead of the link 315 being connected to the valve operating lever therein there is a valve operating plunger 385 pivoted to said lever, having a seal 385a like the seal 140, the plunger 385 having mounted thereon an auxiliary diaphragm 386 which is clamped to the upper diaphragm housing 266 by means of a vented cover plate 387 and a spacing member 387a which has a gasket 387b, a clamping ring 387c and clamping screws 387d. The plunger 385 passes out through the top of the cover plate 387 and above the latter is provided with a spring 388 which is supported within a spring supporting ring 389 having around the same a shell 390 formed on the cover plate 387. It will be noted that this relay valve 265 is for an air-suspended system operating the brakes.

Instead of the relay valve 265 I may use, if desired, a vacuum-suspended relay valve such as shown in Fig. 23. In this instance the construction is the same as the vacuum relay valve 265 shown in Fig. 19, many of the numerals applied being, therefore, the same, except as follows: In the relay valve 265 is this form, the air control pipe 383 is connected to a cover plate 389a and the pipe 267 is connected to the rear diaphragm housings 272a and 273a. Also, instead of having the vents 276a and 277a therein, the rods 276 and 277 pass through packings 389b and 389c, and the pipes 268 and 269 are connected to the vacuum pipe 263, which latter is also connected to the spacing member 387a. Also, the vent at the top of the cover plate 387 is omitted and there is a packing 389d in the cover plate 387.

In Fig. 24 I have shown a slightly modified form of power unit which can be used to intensify the power in any hydraulic line, for example in line 14 if desired, and it is applicable in the operation of brakes or clutches or any other work-performing element. It will be understood that this power unit can be used in any hydraulic line for intensifying the pressure with or without the presence of any other power units. In this figure, I have shown a power unit 391 which in general is constructed the same as the power units of 33 and 37 previously described, but which has the following differences over said units. In this instance I have provided means for balancing out nearly all of the influence of the power operated diaphragm 147 upon the modulating valve mechanism which is operated by the lever therein. However, some of the effect of the power is retained to stabilize the valve mechanism. By this means a higher ratio of pressure is attainable, as the loss therein, in the manual movement of the valve mechanism to resist the effect of the power on the valves is almost entirely avoided. The apparatus in Fig. 24 shows how the design can be altered by cutting down the overall dimensions as it differs from the previously described power units in providing a shorter first pulsator generator including a first pressure generating or intensifying piston 392; and a shorter second servo pulsator generator including a second pressure generating power piston 393, the operation of which is controlled by means of a valve operating mechanism not altered in size, as for instance in the operation of clutches, when a lessened volume of liquid is to be delivered for special purposes. This can be done accordingly by retaining a number of the standard parts. Also by placing the diaphragm clamping ring on the other side of the diaphragm clamping plate, the latter can be made smaller than would otherwise be the case while retaining the same size valve mechanism. In this instance the manually actuated control plunger 392 has therein a recess 395 to receive an end 396 of a rod 397 which passes through an opening 398 in the valve operating lever 394 and has, adjacent to the opening 398, a tapered flange 399 for contacting with said lever 394, to operate the same. The rod 397 passes through a sleeve 399a in a recess 400 in the diaphragm clamping plate 146 and around the sleeve 399a there is a spring 401, which may be lighter than the corresponding spring in the power unit 37, and which rests against the valve operating lever 394. The rod 397 extends through the clamping plate 146 and carries beyond the same an auxiliary diaphragm 402, the inner periphery of which is clamped between washers 403 and 404 carried against a shoulder on the rod 397 and held in place thereon by a nut 405. The outer periphery of the diaphragm 402 is clamped against the face of the clamping plate 146 adjacent to a diaphragm chamber 406 by means of a ring 407 and screws 408.

In Fig. 25 I have shown a further modified form of power unit which may be used in any desired hydraulic line, as in the case of the power unit 391, but which is especially suitable for the operation of the parts of an airplane hydraulically, the parts being made as light as possible and taking up a minimum of space. In this instance I have provided a power unit 409 which is constructed substantially the same as the power unit shown in Fig. 24 except in the following respects and except for differences in proportions for obtaining the maximum lightness of the parts and for the operation of low pressure brakes on airplanes. In this form of power unit I have provided, instead of the diaphragm 147 and the diaphragm housings 152 and 153, a cylindrical shell 410 which is connected to a plunger housing 411 by means of a rubber seal 411a and a series of radial screws 411b. Within the cylinder 410 there is a main piston 412 having a felt ring 413 for carrying lubricant around the same, which is provided with a leather sealing ring 414 within which there is a finger spring supporting ring 415 and a retaining plate 416 fastened to the main piston 412 by screws 417. The piston 412 supports the valves and valve mechanism substantially the same way as shown in the balanced type of valve unit in Fig. 24. It will be noted furthermore, that in this instance there is a manually operated plunger 418 having a long chamber 419 therein for lightness, which carries an internal sleeve 420 as a guide to an end of a rod 421, for indexing the piston with the plunger, provided with a tapered flange 422 for operating the valve lever 394. Also, in this instance there is a power plunger 423 having a thin wall to provide a large air chamber for the purpose of lightness, and a larger area to produce a lower range of pressures. Furthermore, said power plunger 423 operates within a power chamber 424 which is closed by a light metal air cleaner 425 filled with horsehair 426, the air being adapted to pass into the same through apertures 427 and thence through a screen 428 into the air chamber in the power piston 423.

Figure 26:
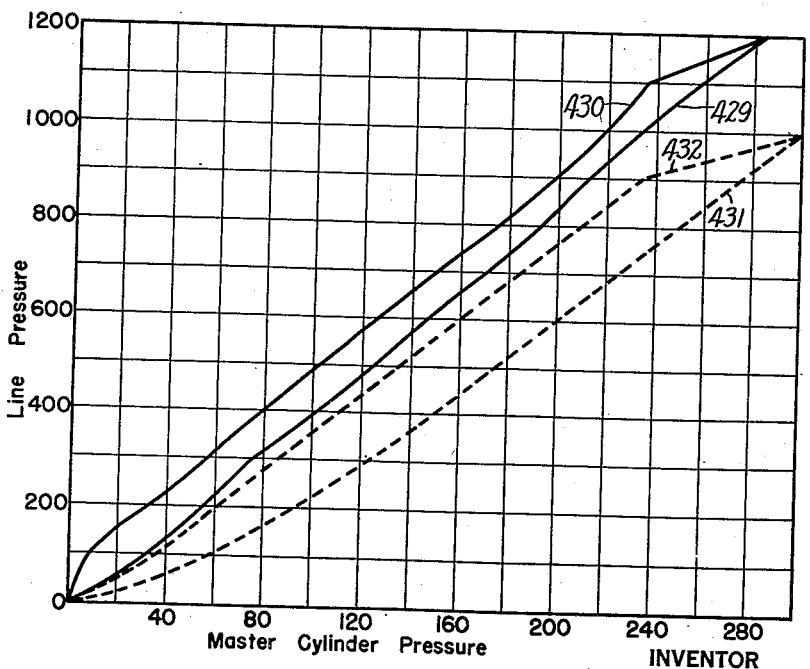
Fig. 26 is a chart showing the advantages of using the balancing diaphragm for the valves in Figs. 24 and 25, the said advantages applying in like manner to the valve balancing diaphragm in the air and relay valves used in the trailer system.

In Fig. 26 I have shown the actual test curves illustrating the advantages of using the valve balancing diaphragm of Fig. 24, and which apply similarly to the valve-balancing diaphragms in the air and relay valves in Fig. 19 and related Fig. 25. In this Fig. 26 there are shown in full lines an on-modulation curve 429 which is a substantially straight line showing the fixed ratio between the master cylinder pressure and the line pressure obtained from the power unit, also a substantially straight line curve 430 for the relative pressures in off-modulation, connected to the straight line curve 429 by short straight lines indicating the intervals of changing the valve positions. Dotted line curves 431 and 432 show, on the other hand, the comparative test pressures obtained, for the on-modulation and off-modulation respectively, without a valve-balancing diaphragm, as for example when using the second stage power unit 37 along with a master cylinder for operating a brake. In these tests, as shown in Fig. 26, lines 431, 432 were made with the device in Fig. 24 but with the rod 397 held stationary with reference to hub assembly 146 so that the balancing effect of the diaphragm 402 was eliminated. It will be noted accordingly that the curves 429 and 430 are more nearly straight lines and indicate a greater amplifying ratio than in the case of the curves 431 and 432, and that there is a smaller difference of pressures between the curves 429 and 430 than between the curves 431 and 432. This is because there is a smaller amount of the manual effort used to operate the valves when provided with the balancing diaphragm, when there is substantially no reaction on the valves. Thus, the brakes are more efficient when using the valve-balancing diaphragm and the amount of hysteresis is less, thereby improving the control. In this way, the reaction on the valves is eliminated except for the small amount necessary in stabilizing the self-lapping of the two valves controlled by the valve-balancing diaphragm and, in this way, a brake reaction is obtained, producing a feel on the manual control which is a more correct measure of braking forces being applied.

*Operation*

In the operation of the apparatus shown in Figs. 1 to 18, it is first assumed that the apparatus is assembled on the chassis as shown in Figs. 1 and 2, and hydraulic brake fluid is supplied to the master cylinder 23 through the filler opening 29a, see Fig. 3. This fluid can be supplied to the master cylinder, preferably, by the use of a pressure bleeding apparatus in accordance with the usual custom. As the piston 25 of the master cylinder is in the retracted position, fluid under pressure will flow through the small compensating port 28 and also may flow through the opening 30a and through the small holes 25b around the lip of the seal 25a into the master cylinder chamber 24 and thence to the pipe 31. In order to exclude all air from the lines to the first and second stage power units 33 and 37 respectively, it is generally convenient and desirable to first bleed the air out of the power units 33 and 37. As these power units are located in the upright position shown in Fig. 5, the bleeder screw 209 on the first stage power unit 33 is retained open until the fluid runs free from occluded air. It, further, will be noted in this connection by reference to Fig. 8 that the bleeder screw 209 and the fluid outlet 34 are located flush with the ends of the bushings 210 and 134 so that there can be no pockets of air trapped in the unit after the same has been bled. This same condition holds true even if the unit is placed in the horizontal position shown in Fig. 8 or in fact in any position between the upright position and any position assumed by the movement of the unit anticlockwise into the horizontal position shown in Fig. 8. By opening the bleeder screw 209 on the second stage unit, the same bleeding action takes place, also, in said second stage power unit 37, the fluid having passed from the first stage power unit 33 by the pipe 35 to the second stage power unit 37. In order to exclude all the additional air from the lines to the wheel brake cylinders, the bleeder screws 8a are opened until the fluid runs free from occluded air. It is well known that the usual master cylinders have provided therein a double check valve in the outlet end thereof for the purpose of maintaining a slight pressure on the fluid beyond the master cylinder. This was for the purpose of making it possible to replenish always the fluid passing to the wheel brakes, and if the master cylinder was at the end of its stroke, by a fast retraction of the pedal a slight pressure would be maintained in the lines to the wheels while permitting fluid to be drawn in through the opening into the master cylinder from its reservoir by passing a lip seal valve on the piston. My feature to be described has made it possible to bleed the system without the use of a pressure bleeder, merely by filling the master cylinder reservoir and by pumping on the pedal and opening the bleeder screws, a circulation of fluid, thus, always being obtained towards the wheel brakes, wherein the suction stroke of the master cylinder will not suck air back into the lines during the back and forth movement of the pedal.

I have found in the operation of my invention that the compensator valve, as formerly used in the master cylinders, as aforesaid, detracted from the nicety of the accurate control of the unit for the reason that it took a predetermined pressure to force the fluid by the master cylinder compensating valve. Therefore, in my system, I have eliminated the double check compensating valve from the master cylinder and have provided a mode of operation in my power units which permits an attainment of this function during the bleeding operation even though power is not being applied to the units.

It will be appreciated that one of the important functions of the double check compensating valve, as used previously, prevents the possibility of creating a subatmospheric pressure in the lines to the wheels during the back and forth movement of the brake pedal. It is very desirable in connection with my arrangement that I prevent a subatmospheric pressure in the lines during the back and forth movement of the pedal, as otherwise air might be sucked into the brake lines through the lips of the wheel cylinder pistons. Irrespective of the pressure or absence of vacuum in my system, when the manual pressure is applied to the pedal 15, the power or second generator piston 195 in the first stage unit 33 is moved thereby slightly to the right in Fig. 8, and simultaneously, the valve 119 is caused to close lightly on its seat while the liquid still can flow past the valve 119, which is accompanied also by the movement of the plunger 124 somewhat towards the left in said figure due to the fluid pressure acting on effective area of plunger 124. The closing of valve 119 results in trapping the liquid in said power unit, and this trapped liquid accordingly cannot escape past the valve 119 until the said valve is opened subsequently by the relaxation of the pressure in the pipe 31, permitting the stop 117 to open said valve. It, now, is assumed that in the utilization of the system for the application of power to the brakes, the vacuum is being supplied from the engine intake manifold and is trapped in the reservoir 74 by the check valve 67. This vacuum from the reservoir 74 passes through the pipe 76 to the vacuum regulating valve 79, as shown in Figs. 1, 7, and 10. The vacuum in the reservoir 74 may have a wide variation. For instance, when going down a grade with the throttle of the engine closed, the vacuum may amount to 25 to 27 inches of mercury. The average vacuum obtainable, however, during average conditions will be generally from 15 to 18 inches of mercury. The proportions of the units 33 and 37, with regard to their pressure responsive areas, are designed to accommodate this average pressure, in order that they will put out the required line pressures, which may be from 1450 p. s. i. to 1700 p. s. i. Also, it is important that certain maximum line pressures will not be exceeded in order to avoid failures in operation. By adjusting the vacuum by means of the adjusting screw 104, I can adjust the line pressure obtained so as to apply the apparatus to various types of installation.

Assume now that additional manual pressure is applied to the pedal 15 this liquid pressure from the master cylinder 23 is delivered by the pipe 31 to the inlet 32 of the first stage intensifier power unit 33. These master cylinder pressures usually range from 0 to 200 lbs. per square inch for the sizes hereinabove referred to, although much higher pressures may be applied, if desired. The full stroke of the piston 124 in the first stage power unit is capable of taking up all the volume of the master cylinder. When the brakes are badly worn and when the plunger piston surface has received about one half the master cylinder volume, the brakes will have been moved through the "engaging stage" and the second stage unit 37 will cut in, at the actual brake application or "squeeze stage" that is when about 200 lbs. pressure is delivered to the wheels and to the second stage unit. At the beginning pressure of the liquid in the unit 33 will initially be equalized by passing through the holes 115, 116 past the open valve 119, 120 through the chamber 123 and passageway 127 to the annular chamber 126 and thence by the port 132 to the chamber 133 and out of the unit by the passageway 34. As soon as the manual pressure is applied in this way, in addition to applying the manual pressure to the brakes, the manual pressure at once moves the power piston 195 towards the right in Fig. 8, resulting in opening the air valve 186, 187 somewhat so as to admit additional air to the diaphragm casing 153 on the right hand side of the diaphragm 147, and before the valve 119, 120 is closed. The motor diaphragm hub or clamping plate 146 is maintained in spaced relation to the left-hand end of the casing 51, due to the action of the plunger 118 engaging the stop 117 and the action of motor spring 202. The admission of additional air to the right side of motor diaphragm 147 causes the motor diaphragm to shift to the left reversing the direction of movement of plunger 124 and again closing air valve 186, 187. The normal location of the diaphragm or plate 146 in this position away from the casing 51 provides a gradual or smooth transition from the application of manual pressure to the first stage power pressure and similarly from the first stage to the second stage pressure on the brakes and prevents a sudden perceptible jump from one of these pressures to the other. This is an important distinction and improvement over my prior application Ser. No. 388,003, now Patent No. 2,398,252, above referred to, in which prior application the diaphragm assembly is against the housing when the transition is made from manual to power pressure. In the present application the fluid in the casing 153 on the right side of diaphragm 147 acts as a cushion to prevent any perceptible bump during the transition. When a predetermined relatively low pressure has been applied from the master cylinder 23, it effects the closing of the valve 119, 120, inasmuch as the plunger 124 moves forwardly, releasing the valve stem or projection 118 from the stop 117. It has been found that in the unit 33 herein disclosed said predetermined pressure may be about 20 lbs. per square inch or less. Simultaneously, the movement of the plunger 124 in this way moves the valve lever 160 so as to apply an opening force to air valve 186, 187 to apply further power to the operation of the second servo pulsator generator piston or power piston. The vacuum applied in the operation of my invention as above stated is capable of regulation by manual adjustment of the screw 104, Fig. 7, the spring 107 being a measure of the amount of vacuum applied. It will be seen, also, that the diaphragm 100 balances out the effective area of the valve 92, 93 regardless of the varying influence of the vacuum in the pipe 77 on the valve 92, 93. In this way, the influence of the area of the valve 92, 93 on the vacuum in the pipe 111 is avoided so that the vacuum in the pipe 111 can be held in close limits. This vacuum admitted within the diaphragm casing 152, 153 is normally present on both sides of the diaphragm 147 in substantially the same degrees. Due to the action of motor spring 202, air valve 186, 187 may be operated to admit a small amount of air to the right side of motor diaphragm 147 in the normal off position of the unit. Thus valve 175, 178 in Fig. 8 is closed in the initial operating position of the apparatus as shown in Fig. 17, as above referred to, the full vacuum may be cut off from the right hand side of the diaphragm 147 and a slight intermediate pressure effected on the right of the motor diaphragm. All of the modulating valves 175, 178, 186, 187 will remain closed until, upon further pressure exerted from the master cylinder, the first generator piston operates plunger 124 and valve lever 160 to move the valve rod 172 so as to unseat the valve ring 186 from its seat 187 to the extent desired, thus admitting additional air pressure from the port 53 through the central passageway 203 thence through the ports 194 opening 192 chamber 185 the said second stage intensifier power unit in substantially the same way as described in connection with the first stage intensifier power unit 33, and as a result pressure liquid of very much higher pressures is delivered from the outlet connection 38. For instance, where a manual pressure of 200 lbs. per square inch from the master cylinder 23 is delivered through the pipe 31, a pressure of 1700 lbs. per square inch or higher will be delivered from the outlet connection 38 of the second stage unit 37. In fact, the ratio of pressure or force applied from the master cylinder to the first stage intensifier power unit will always remain substantially the same with regard to the pressures delivered from the first stage outlet 34 notwithstanding the changes in the pressures which may be delivered from the master cylinder, and this is also true in the operation of the second stage intensifier power unit 37. This high pressure liquid delivered from the outlet 38 will be delivered directly to the brake cylinders through the pipe 14. After the operation of the power units, owing to the valve 119, 120, it is not necessary to maintain a pressure between the master cylinder and the power units and, accordingly, no outlet valve is necessary on the master cylinder and the lip valve 25a, during the back and forth movement of the pedal 15, will permit, when necessary, the withdrawal of liquid into the system from the master cylinder 23. The liquid compensation valve is thus, in reality, the valve 119, 120 located in the power unit 33 instead of on the master cylinder. It will be noted that in the operation of the valves 175, 178 and 186, 187 the diaphragm 180 balances the force is applied to the pedal 15, the valve 186, 187 will move into the position shown in Fig. 18 as a maximum, admitting the desired amount of air pressure to the right of the diaphragm 147, the opening of the valve 186, 187 being prevented from exceeding a maximum by the flange stop member 159, which also takes any possible strain off the diaphragm 180 and the valve lever 160. When the desired amount of manual pressure has been reached, the valve 186, 187 will be closed by the air pressure admitted to the right of the diaphragm 147 which causes the valve to be moved by the movement of the lever 160, so as to restore the lap position shown in Fig. 17. Upon any relaxation of the manual pressure on the pedal, this will, as shown in Fig. 16, result in the unseating of the valve 175, 178 to the extent desired so as to admit the amount of vacuum past said valve and through the ports 191 to the right of the diaphragm 147 and when any desired position of the foot pedal has been reached in this way, the spring 202 will cause the seating of the valve 175, 178 so as to restore the lap position of the valves. This movement to lap position also is aided by the position of the power piston 195, as the differential of pressures on the two sides of the diaphragm 147 will accord with the pressure in the outlet 34, and will accord with the reaction pressure on the foot by means of the annular chamber 126.

In the off-modulation of the brakes, that is to say when the master cylinder is being released, the valve 119, 120 will be restored to open position when the plunger 124 is returned toward the starting position, by reason of the stop 117, thus allowing for liquid compensation through said valve, and thence through the compensation port 28 in the master cylinder. Also, the pressure being released from the valve operating lever 160, the valve 175, 178 will be restored to open position initially and finally to lap position, whereas the valve 186, 187 will be returned to closed position, thus admitting the vacuum to both sides of the diaphragm 147, in the first stage intensifier power unit 33. Substantially the same operation takes place in the second stage intensifier power unit 37 except that initially the valve 175, 178 therein is initially open because of the strong springs 173a. The movements of the valves mounted on the diaphragms in the first and second stage intensifier power unit thus operate, by on-modulation or off-modulation, to supply added pressure to the liquid delivered to the pipe 14. In this way, modulated pressures of any desired amount can be obtained for the operation of the brakes or any part of an automotive vehicle which is desired to be moved. The power operated system, above described, provides an extreme nicety of control which makes said device applicable to the operation of the parts, such as brakes, clutches, etc., where any power controlled mechanism is of necessity required to have an extreme exactness of control so as to be capable of effective use.

In the operation of my invention shown in Figs. 19 to 22, as applied to trailers, the system, after opening the bleeder screws, is first filled with the hydraulic liquid to exclude air. The bleeder screws are then closed. The system thereafter will remain completely filled with the liquid, especially as, by the pumping action of the pedal lever 226, the liquid will be replenished through the compensator valve, such as the valve 119, 120 located at the inlet 232 of the first stage power unit, and the same is true in regard to the inlet 236 on the second stage power unit, and as the liquid can pass into the system in this way past the lip valve 25a on the master cylinder piston. The manual pressure thus applied will operate the first and second stage power units to apply the brakes on the front and rear wheels 242, 243, 247 and 248 in substantially the same way as described above in connection with Figs. 1 to 18. For this purpose, it will be understood that the displacement on the manual plunger in the first stage unit is the same as the master cylinder piston displacement, and when the brakes are worn somewhat at this point and when about 200 lbs. per square inch of manual pressure has been applied the shoes of the brakes will have become set in position. Furthermore, the displacement of the manual plunger in the second stage unit is ½ the displacement in the first stage unit. The second stage unit comes into action after the brakes have been set and when about 200 lbs. per square inch of manual pressure has been received from the master cylinder, and thereafter the main braking effect is attained by the intensification of the pressure due to the first and second stage power units, and when the braking effect is being applied by the first stage power unit the pressure so applied is multiplied by the pressures being applied from the second stage power unit. From this it will be seen that the pressures in the two power units 33 and 37 are not merely added together and that accordingly the two power units occupy less space than if a single power unit were used or merely two power units in which the volumes were added together. This arrangement, also, results in a saving of vacuum. This action of the power units to intensify the manual pressures by means of the first and second stage power units is accomplished, as in the case of the power units described in connection with Figs. 1 to 18, by the admission of atmospheric air pressure to the power units to the extent controlled by the manual pressures applied thereto. The atmospheric air pressure thus admitted, to the extent referred to, controls the application of the trailer brakes in this form of my invention. When the vacuum first goes on, in the operation of the engine, momentarily the vacuum from the pipe 291 will go through the hand valve apparatus 293, to pull down the diaphragm 386 and close the vacuum valve in the relay valve apparatus 265, Fig. 22, and admit air to the trailer brakes to release the brakes, but as the vacuum then continues to act on the diaphragm 386 this moves it downwardly to open the air inlet valve on the relay apparatus 265 while maintaining the vacuum valve closed on the relay apparatus until the spring 377 balances the differential pressures on the two sides of the diaphragm 384 to set the brakes. The spring 388 is so chosen in regard to the area of the diaphragm 386 as to permit the downward movement of the diaphragm 386 and keep the air valve open during this operation, while accumulating pressure in the spring 377. This accumulated pressure acts quickly to give fast operation of the trailer brakes. Thereafter, the modulation of the air in the pipe 291 will apply the brakes according to the degree of manual modulation. That is to say, when the vacuum in the pipe 291 is lessened manually to apply the brakes this raises the diaphragm 386 somewhat by reason of the spring 386, which allows the air inlet valve to close in the relay apparatus 265 and opens the vacuum valve in the relay 265 to that extent and admits the vacuum to apply the trailer brakes until the spring 377 permits a lap position in the valves, which are held in this position until a further change in the vacuum takes place. When the coupler 382 breaks away the brakes are set by the diaphragm 386 moving upwardly by reason of the spring 388 and admitting vacuum from the trailer reservoir 262 so as to move the diaphragms 274 and 275 to the right. The degree of vacuum applied manually to the trailer brakes can be regulated manually when desired by means of the handle 295 to operate the trailer brakes independently therefrom and said handle may be held in any one of many adjusted positions by the recesses 308 engaging with the spring-pressed ball 306. In other words, this adjusts the extent of movement of the vacuum valve 334, 335. Also, it will be noted that in the operation of the vacuum valve adjusting apparatus 293 the valves 334, 335 and 344, 345 are balanced by reason of the diaphragm 356 which prevents the difference in pressures on the two sides of the diaphragm 322 and the movement thereof from substantially influencing the positions of said valves. The degree of differential fluid pressures will thus be represented by the amount of compression of the spring 377. This mode of operation greatly conduces to the accuracy in the operation of these valves for the control of the trailer brakes.

In the operation of the vacuum-suspended type of the relay vacuum valve apparatus, as shown in Fig. 23, the vacuum is normally on both sides of the diaphragms 274 and 275 and modulated air is applied to the left hand side thereof by the pipe 267, which is received from the relay vacuum valve apparatus 265, the vacuum being on both sides of the diaphragm 384 therein as well as on both sides of the diaphragm 386, and the diaphragm being retracted by the spring 377, the same being controlled by the movement of the diaphragm 386. In this instance the position of the diaphragm 386 is controlled by the modulated air being received from the pipe 383 which is connected to the upper face of the diaphragm 386 instead of to the lower face thereof, as described in connection with Figs. 20 and 21.

In the modified form of power unit shown in Fig. 24, which is designed for the intensification of any hydraulic line pressure, the operation is substantially the same as the operation of the second stage power unit 37 with the exception that in this instance the air inlet and vacuum valves are balanced by the auxiliary diaphragm 402 which substantially eliminates the movement of said valves as a whole by differences in pressures on the two sides of the diaphragm 147. This enables a higher ratio of output to input pressures to be obtained by avoiding loss of manual effort in the operation of the air inlet and vacuum valves. This form of power unit is particularly useful in connection with the operation of clutches because of its accuracy in operation and nicety of control, although it is applicable in the operation of brakes or any other part to perform work.

In the modified form of power unit shown in Fig. 25, the operation is substantially the same as in the operation of the power unit shown in Fig. 24. In this instance, however, the power is applied by means of a piston 412, instead of the diaphragm 147, the said piston being operated by the modulated air pressure admitted through the air filter 425. Furthermore, in this form of my invention the parts are made very light by the elimination of unnecessary metal so as to adapt the same for use, particularly, in connection with the parts of airplanes. It will be noted that in this form of my invention, also, the air inlet and vacuum valves which are mounted on the piston 412 are balanced by an auxiliary diaphragm, as in the case of the power unit in Fig. 24, so as, substantially, to eliminate loss of manual effort in the operation of the valves and so as to obtain a higher ratio of output to input pressures. Also, in this form of power unit, by using a piston instead of a diaphragm, it will be noted that the diaphragm on which the valves are mounted and the auxiliary diaphragm for balancing the said valves can be located near the periphery of the piston and this enables the structure to be made more compact and lighter for airplane equipment. This, also, shows how, while retaining valves of the same size but using a different size power piston, a lower pressure can be delivered, so that thereby the apparatus can be adapted to the different requirements of different installations, as desired, by using a minimum of extra parts.

While I have described my invention above in detail I wish it to be understood that many changes may be made therein without departing from the spirit of the same.

I claim:

1. In a hydraulic pressure power applying apparatus including, means defining a hydraulic pressure intensifying unit, means for delivering to the unit a hydraulic control pressure for effecting the actuation of the said unit and for being intensified by said unit, connecting means adapted to be connected to a source of pressure differing from the atmospheric pressure; said power unit comprising means defining a housing having therein a movable motive wall, a modulating valve assembly carried by said wall for admitting said pressure differing from the atmospheric pressure and for admitting atmospheric pressure for causing the movement of said motive wall, a control plunger operable in response to said input control pressure for effecting the actuation of said modulating valve mechanism in proportion to said input control pressure, means defining a cylinder incorporating a hydraulic pressure intensifying power piston operable by said motive wall to produce an increased hydraulic pressure in said control pressure fluid which is a predetermined amplified value of said input control pressure, means defining a compensation valve effective in response to a predetermined movement of said control plunger for shutting off direct fluid communication between said inlet control fluid pressure and the intensified pressure in communication with said power intensifying piston and means effective to actuate said modulating valve assembly in the off position of said unit to deliver pressures below the value of said atmospheric pressure to both sides of said motive wall, said means comprising a spring urging said motive wall in the off direction with a predetermined force, whereby said motive wall assumes a position intermediate its maximum ranges of travel in each direction in the normal off position thereof.

2. In a power applying apparatus including means defining a hydraulic pressure intensifying unit, means for delivering to said unit a control pressure for amplification by said unit and adapted to be delivered therefrom to a pressure consuming motor, connecting means adapted to be connected to a source of pressure differing from the surrounding atmosphere; said hydraulic pressure intensifying unit comprising a housing having therein a movable motor defining wall, means defining a modulating valve assembly for said atmospheric pressure and for said pressure differing from the surrounding atmospheric pressure, said assembly being carried by said motive wall, said valve assembly being effective to deliver differential of pressure to the opposite sides of said motive wall for driving the same as a motor, a control plunger responsive to said control pressure fluid effective to move said modulating valve assembly in proportion to the value of said control pressure, means defining a cylinder incorporating a hydraulic pressure intensifying piston driven by said motive wall effective to produce an intensified hydraulic pressure in said control pressure liquid which is a predetermined amplification of said input control pressure, valve means effective to shut off direct fluid communication between said control pressure fluid input and said intensified pressure fluid in response to a predetermined movement of said control pressure responsive plunger, said hydraulic pressure intensifying piston having a longitudinal air passageway formed therethrough and means for placing the same in communication with said modulating valve assembly and means for placing said passageway in communication with the surrounding atmosphere whereby to transmit atmospheric pressure to said modulating valve assembly.

3. In a servo power generating and applying apparatus including means defining a power unit, means for delivering hydraulic inlet control pressure to said unit for effecting the actuation thereof, connecting means adapted to be connected to a source of pressure differing from the surrounding atmospheric pressure; said power unit comprising means defining a housing having therein a movable motive wall, means defining a modulating valve assembly carried by said wall and effective to admit a differential of pressure to the opposite sides of said wall for driving the same, a differential piston and plunger for actuating said valve mechanism in response to said inlet control pressure, said piston having a liquid compensating valve therein for controlling the flow between the opposite differential surfaces thereof, means defining a cylinder incorporating a power generating follower piston driven by said motive wall for producing an amplification of said inlet control pressure, a first cylinder receiving said differential piston and plunger, a second adjacent cylinder receiving said intensifying piston, means connecting said cylinders, means defining an inlet for atmospheric pressure to said valve mechanism adjacent the terminal of said intensifying piston remote from said movable wall, said power piston having a longitudinal air passageway formed therethrough leading from said air inlet to said modulating valve mechanism and a valve operating lever interposed between the terminal of said plunger and said modulating valve assembly for effecting the actuation of said valve assembly in proportion to the value of said inlet control pressure.

4. A pressure liquid power applying apparatus comprising a power unit, hydraulic means for delivering actuating liquid to said unit, a connection on the apparatus adapted to be connected to a source of a pressure differing from the atmospheric pressure, said unit comprising means defining a housing having a movable wall, a valve mechanism for admitting the said pressure differing from the atmospheric pressure for moving said wall, a differential piston, having a liquid compensation valve, for moving said valve mechanism, and a power plunger having means in said housing defining a cylinder therefor, said plunger being movable by said wall to produce an increased hydraulic pressure in the liquid used for the actuation of the unit, said differential piston having an aligning indexing means connecting it to said movable wall.

5. A power unit apparatus comprising a connection on the power unit adapted to be connected to a source of fluid pressure differing from the atmosphere, means defining a housing incorporating a movable wall arranged to be actuated by said fluid pressure, means defining a cylinder having a hydraulic power generating piston operable therein, said piston including a reduced cross section plunger connected to said movable wall for operation thereby, valve mechanism controlling the presence of said fluid pressure for moving said wall, and means for controlling the movement at will of said valve mechanism, said valve mechanism comprising a valve operating lever and a hydraulically operated means including a plunger operating said lever located adjacent the power plunger, said plunger having guide means to maintain registry with the movable wall, said power plunger being located intermediate the ends of said valve lever.

6. A power unit having a connection on the power unit adapted to be connected to a source of pressure differing from the atmospheric pressure, means defining a housing having a movable wall therein arranged to be operable in response to said pressure acting on one side thereof and to a second fluid pressure on the other side thereof and between which pressures the wall is floated in its initial position and at which time the second fluid pressure is substantially the same pressure as the first mentioned pressure, said initial position including means for normally positioning said initial position which is intermediate the extreme limits of movement of said wall, a power plunger operated thereby, valve means for controlling the application of said pressure to the movable wall, and means for applying a hydraulic pressure variable at will for moving a part for work performance and for moving said valve means including a cut-off valve moved to cut off hydraulic pressure to said part after the valve means has been opened to the second fluid pressure.

7. A power unit having a connection on the power unit adapted to be connected to a source of pressure differing from the atmospheric pressure, means defining a housing having a movable wall arranged to operate in response to said pressure acting on one side thereof and to a second fluid pressure on the other side thereof and between which pressures the wall is floated in its initial position and at which time the second fluid pressure is substantially the same pressure as the first mentioned pressure, said initial position including means for normally positioning said initial position which is intermediate the extreme limits of movement of said wall, a power plunger operated thereby, valve means for controlling the application of said pressure to the movable wall, and means for applying a hydraulic pressure variable at will for moving a part for work performance and for moving said valve means including a cut-off valve moved to cut off hydraulic pressure to said part after the valve means has been opened to the second fluid pressure, said housing for said wall being located normally out of contact with the movable portion of the movable wall.

EDWARD A. ROCKWELL.

REFERENCES CITED

The following references are of record in the file of this patent:

UNITED STATES PATENTS

| Number | Name | Date |
|---|---|---|
| 1,650,488 | Bragg et al. | Nov. 22, 1927 |
| 1,732,052 | Joyce | Oct. 15, 1929 |
| 1,770,194 | Bragg et al. | July 8, 1930 |
| 1,848,464 | Dodge | Mar. 8, 1932 |
| 1,874,293 | Hook et al. | Aug. 30, 1932 |
| 1,914,600 | Hewitt | June 20, 1933 |
| 1,923,187 | Bragg et al. | Aug. 22, 1933 |
| 2,005,971 | Edwards | June 25, 1935 |
| 2,032,185 | Sciaky | Feb. 25, 1936 |
| 2,058,377 | Francis | Oct. 20, 1936 |
| 2,062,500 | Casler et al. | Dec. 1, 1936 |
| 2,079,252 | Healy | May 24, 1937 |
| 2,111,322 | Johnson | Mar. 15, 1938 |
| 2,137,533 | Laner | Nov. 22, 1938 |
| 2,149,106 | Stitt | Feb. 28, 1939 |
| 2,204,530 | Eaton | June 11, 1940 |
| 2,206,656 | Boldt | July 2, 1940 |
| 2,212,913 | Breese | Aug. 27, 1940 |
| 2,215,602 | Baade | Sept. 24, 1940 |
| 2,260,490 | Stelzer | Oct. 28, 1941 |
| 2,260,491 | Stelzer | Oct. 28, 1941 |
| 2,271,278 | St. Clair | Jan. 27, 1942 |
| 2,279,276 | Oliver | Apr. 7, 1942 |
| 2,305,638 | Rockwell | Dec. 22, 1942 |
| 2,322,063 | Schnell | June 15, 1943 |
| 2,353,755 | Price | July 18, 1944 |
| 2,357,032 | Stelzer | Aug. 29, 1944 |
| 2,374,545 | Ingres | Apr. 24, 1945 |
| 2,377,699 | Klimkiewicz | June 5, 1945 |
| 2,388,220 | Rockwell | Oct. 30, 1945 |
| 2,398,165 | Stelzer | Apr. 9, 1946 |
| 2,398,252 | Rockwell | Apr. 9, 1946 |

FOREIGN PATENTS

| Number | Country | Date |
|---|---|---|
| 2,024 | Great Britain | July 4, 1872 |
| 23,596 | Great Britain | Oct. 25, 1911 |
| 620,663 | France | Jan. 22, 1927 |
| 751,362 | France | June 19, 1933 |
| 559,789 | Germany | Sept. 24, 1932 |